United States Patent
Iyer et al.

(10) Patent No.: US 11,391,514 B2
(45) Date of Patent: Jul. 19, 2022

(54) LITHIUM STUFFED GARNET SETTER PLATES FOR SOLID ELECTROLYTE FABRICATION

(71) Applicant: QuantumScape Battery, Inc., San Jose, CA (US)

(72) Inventors: Sriram Iyer, San Jose, CA (US); Tim Holme, San Jose, CA (US); Niall Donnelly, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 90 days.

(21) Appl. No.: 16/918,827

(22) Filed: Jul. 1, 2020

(65) Prior Publication Data

US 2020/0333076 A1 Oct. 22, 2020

Related U.S. Application Data

(63) Continuation of application No. 15/787,623, filed on Oct. 18, 2017, now Pat. No. 10,746,468, which is a
(Continued)

(51) Int. Cl.
*C04B 35/64* (2006.01)
*F27D 5/00* (2006.01)
(Continued)

(52) U.S. Cl.
CPC .......... *F27D 5/0006* (2013.01); *B28B 7/0097* (2013.01); *B30B 15/34* (2013.01);
(Continued)

(58) Field of Classification Search
CPC ....... C04B 35/10; C04B 35/119; C04B 35/44; C04B 35/48; C04B 35/4885; C04B 35/64;
(Continued)

(56) References Cited

U.S. PATENT DOCUMENTS

| 4,259,061 A | 3/1981 | Dubetsky |
| 4,340,436 A | 7/1982 | Dubetsky et al. |

(Continued)

FOREIGN PATENT DOCUMENTS

| CN | 1746757 A | 3/2006 |
| CN | 101518164 A | 8/2009 |

(Continued)

OTHER PUBLICATIONS

Willmann et al., "Characteristics and evaluation criteria of substrate-based manufacturing. Is roll-to-roll the best solution for printed electronics?", Organic Electronics, 2014, vol. 15, pp. 1631-1640.
(Continued)

*Primary Examiner* — Noah S Wiese
(74) *Attorney, Agent, or Firm* — Squire Patton Boggs (US) LLP

(57) ABSTRACT

Setter plates are fabricated from Li-stuffed garnet materials having the same, or substantially similar, compositions as a garnet Li-stuffed solid electrolyte. The Li-stuffed garnet setter plates, set forth herein, reduce the evaporation of Li during a sintering treatment step and/or reduce the loss of Li caused by diffusion out of the sintering electrolyte. Li-stuffed garnet setter plates, set forth herein, maintain compositional control over the solid electrolyte during sintering when, upon heating, lithium is prone to diffuse out of the solid electrolyte.

20 Claims, 15 Drawing Sheets

Related U.S. Application Data continuation of application No. 15/286,509, filed on Oct. 5, 2016, now Pat. No. 9,970,711, which is a continuation of application No. PCT/US2016/027886, filed on Apr. 15, 2016.

(60) Provisional application No. 62/148,337, filed on Apr. 16, 2015.

(51) Int. Cl.

| | |
|---|---|
| *H01M 10/052* | (2010.01) |
| *H01M 10/0585* | (2010.01) |
| *C04B 35/10* | (2006.01) |
| *C04B 35/119* | (2006.01) |
| *C04B 35/44* | (2006.01) |
| *C04B 35/48* | (2006.01) |
| *C04B 35/486* | (2006.01) |
| *C04B 35/488* | (2006.01) |
| *C08K 3/105* | (2018.01) |
| *C08K 5/09* | (2006.01) |
| *C08K 5/12* | (2006.01) |
| *H01M 10/0562* | (2010.01) |
| *B28B 7/00* | (2006.01) |
| *H01M 10/0525* | (2010.01) |
| *B30B 15/34* | (2006.01) |
| *F27B 17/02* | (2006.01) |
| *F27B 21/02* | (2006.01) |
| *H01M 10/04* | (2006.01) |
| *C08K 3/22* | (2006.01) |

(52) U.S. Cl.
CPC ............ *C04B 35/10* (2013.01); *C04B 35/119* (2013.01); *C04B 35/44* (2013.01); *C04B 35/48* (2013.01); *C04B 35/486* (2013.01); *C04B 35/4885* (2013.01); *C04B 35/64* (2013.01); *C08K 3/105* (2018.01); *C08K 5/09* (2013.01); *C08K 5/12* (2013.01); *F27B 17/02* (2013.01); *F27B 21/02* (2013.01); *H01M 10/0481* (2013.01); *H01M 10/052* (2013.01); *H01M 10/0525* (2013.01); *H01M 10/0562* (2013.01); *H01M 10/0585* (2013.01); *C04B 2235/3203* (2013.01); *C04B 2235/3217* (2013.01); *C04B 2235/3222* (2013.01); *C04B 2235/3227* (2013.01); *C04B 2235/3244* (2013.01); *C04B 2235/3248* (2013.01); *C04B 2235/447* (2013.01); *C04B 2235/6025* (2013.01); *C04B 2235/65* (2013.01); *C04B 2235/764* (2013.01); *C04B 2235/77* (2013.01); *C04B 2235/785* (2013.01); *C04B 2235/786* (2013.01); *C04B 2235/94* (2013.01); *C04B 2235/963* (2013.01); *C04B 2235/9623* (2013.01); *C08K 2003/2203* (2013.01); *F27D 2005/0081* (2013.01); *H01M 2300/0071* (2013.01)

(58) Field of Classification Search
CPC .... C04B 2235/3203; C04B 2235/3217; C04B 2235/3222; C04B 2235/3227; C04B 2235/3244; C04B 2235/3248; C04B 2235/6025; C04B 2235/65; C04B 2235/764; C04B 2235/9623; H01M 10/052

See application file for complete search history.

(56) References Cited

U.S. PATENT DOCUMENTS

| | | |
|---|---|---|
| 4,492,783 A | 1/1985 | Tanaka et al. |
| 4,878,838 A | 11/1989 | Verheyden, Jr. |
| 5,014,763 A | 5/1991 | Frank |
| 5,130,067 A | 7/1992 | Flaitz et al. |
| 5,250,243 A | 10/1993 | Allaire et al. |
| 5,256,242 A | 10/1993 | Imaeda et al. |
| 5,279,994 A | 1/1994 | Kerkar |
| 5,296,318 A | 3/1994 | Gozdz et al. |
| 5,456,000 A | 10/1995 | Gozdz et al. |
| 5,460,904 A | 10/1995 | Gozdz et al. |
| 5,620,637 A | 4/1997 | Kaga et al. |
| 5,874,162 A | 2/1999 | Bastian et al. |
| 5,915,958 A | 6/1999 | Kurie |
| 5,922,493 A | 7/1999 | Humphrey, Jr. et al. |
| 6,277,524 B1 | 8/2001 | Kanno |
| 6,306,336 B1 | 10/2001 | Hrezo et al. |
| 6,306,535 B1 | 10/2001 | Tomimatsu et al. |
| 6,322,923 B1 | 11/2001 | Spotnitz et al. |
| 6,447,712 B1 | 9/2002 | Dogan et al. |
| 6,514,072 B1 | 2/2003 | Bencic |
| 6,561,799 B2 | 5/2003 | Baudry et al. |
| 6,656,641 B1 | 12/2003 | Kumar |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,736,810 B2 | 6/2010 | Noh |
| 7,794,557 B2 | 9/2010 | Hui et al. |
| 7,901,658 B2 | 3/2011 | Weppner et al. |
| 7,923,149 B2 | 4/2011 | Hwang et al. |
| 7,947,213 B2 | 5/2011 | Badding et al. |
| 8,092,941 B2 | 1/2012 | Weppner et al. |
| 8,235,710 B2 | 8/2012 | Bloemacher et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,375,734 B2 | 2/2013 | Hall et al. |
| 8,425,225 B2 | 4/2013 | Pasquinet et al. |
| 8,431,287 B2 | 4/2013 | Teramoto |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 9,287,106 B1 | 3/2016 | Miao et al. |
| 9,362,546 B1 | 6/2016 | Donnelly et al. |
| 9,790,121 B2 | 10/2017 | Abramov et al. |
| 9,806,372 B2 | 10/2017 | Holme et al. |
| 9,966,630 B2 | 5/2018 | Cheng et al. |
| 9,970,711 B2 | 5/2018 | Iyer et al. |
| 10,008,742 B2 | 6/2018 | Holme et al. |
| 10,026,990 B2 | 7/2018 | Badding et al. |
| 10,103,405 B2 | 10/2018 | Choi et al. |
| 10,155,667 B2 | 12/2018 | Badding et al. |
| 10,283,811 B2 | 5/2019 | Badding et al. |
| 10,290,895 B2 | 5/2019 | Holme et al. |
| 10,305,141 B2 | 5/2019 | Choi et al. |
| 10,347,936 B2 | 7/2019 | Choi et al. |
| 10,347,937 B2 | 7/2019 | Beck et al. |
| 10,361,455 B2 | 7/2019 | Allenic et al. |
| 10,396,396 B2 | 8/2019 | Badding et al. |
| 10,403,931 B2 | 9/2019 | Holme et al. |
| 10,403,932 B2 | 9/2019 | Choi et al. |
| 10,422,581 B2 | 9/2019 | Lyer et al. |
| 10,431,806 B2 | 10/2019 | Donnelly et al. |
| 10,431,850 B2 | 10/2019 | Choi et al. |
| 10,439,251 B2 | 10/2019 | Holme et al. |
| 10,486,332 B2 | 11/2019 | Badding et al. |
| 10,563,918 B2 | 2/2020 | Iyer et al. |
| 10,581,115 B2 | 3/2020 | Badding et al. |
| 10,651,502 B2 | 5/2020 | Holme et al. |
| 10,766,165 B2 | 9/2020 | Badding et al. |
| 10,804,564 B2 | 10/2020 | Allenic et al. |
| 10,862,161 B2 | 12/2020 | Choi et al. |
| 10,875,212 B2 | 12/2020 | Badding et al. |
| 10,967,539 B2 | 4/2021 | Badding et al. |
| 11,014,822 B2 | 5/2021 | Badding et al. |

(56) References Cited

U.S. PATENT DOCUMENTS

| | | |
|---|---|---|
| 11,111,155 B1 | 9/2021 | Badding et al. |
| 11,148,321 B2 | 10/2021 | Badding et al. |
| 2002/0054419 A1 | 5/2002 | Beteille et al. |
| 2002/0182556 A1 | 12/2002 | Baudry et al. |
| 2003/0049499 A1 | 3/2003 | Murakawa et al. |
| 2003/0072870 A1 | 4/2003 | Brandle et al. |
| 2003/0148179 A1 | 8/2003 | Uyama et al. |
| 2004/0074338 A1 | 4/2004 | Kuhn et al. |
| 2004/0191617 A1 | 9/2004 | Visco et al. |
| 2005/0016839 A1 | 1/2005 | Horne et al. |
| 2006/0120160 A1 | 6/2006 | Park et al. |
| 2006/0197245 A1 | 9/2006 | Cheng et al. |
| 2007/0015061 A1 | 1/2007 | Klaassen |
| 2007/0148553 A1 | 6/2007 | Weppner et al. |
| 2007/0231704 A1 | 10/2007 | Inda |
| 2008/0145751 A1 | 6/2008 | Ogumi et al. |
| 2008/0199822 A1 | 8/2008 | Blomacher et al. |
| 2009/0162755 A1 | 6/2009 | Neudecker |
| 2009/0194222 A1 | 8/2009 | Teramoto |
| 2009/0197172 A1 | 8/2009 | Inda |
| 2009/0226790 A1 | 9/2009 | Kanamura et al. |
| 2009/0298001 A1 | 12/2009 | Klein et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0062385 A1 | 3/2010 | Pasquinet et al. |
| 2010/0203383 A1 | 8/2010 | Weppner et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0198785 A1 | 8/2011 | Kester et al. |
| 2011/0223487 A1 | 9/2011 | Johnson et al. |
| 2011/0244337 A1 | 10/2011 | Ohta et al. |
| 2011/0262796 A1 | 10/2011 | Shimooka et al. |
| 2011/0281175 A1 | 11/2011 | Hudson et al. |
| 2012/0100433 A1 | 4/2012 | Suyama et al. |
| 2012/0196189 A1 | 8/2012 | Babic et al. |
| 2012/0237834 A1 | 9/2012 | Ogasa |
| 2012/0247154 A1 | 10/2012 | Abramov et al. |
| 2012/0276439 A1 | 11/2012 | Fujita et al. |
| 2013/0085055 A1 | 4/2013 | Raj et al. |
| 2013/0122380 A1 | 5/2013 | Visco et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |
| 2013/0230778 A1* | 9/2013 | Saimen ............... H01M 10/056 |
| | | 429/303 |
| 2013/0260257 A1 | 10/2013 | Choi |
| 2013/0288875 A1 | 10/2013 | Miyagawa et al. |
| 2013/0344416 A1 | 12/2013 | Sakamoto et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0120409 A1 | 5/2014 | Ouchi et al. |
| 2014/0120421 A1 | 5/2014 | Ouchi et al. |
| 2014/0134483 A1 | 5/2014 | Ouchi et al. |
| 2014/0162113 A1 | 6/2014 | Ohta et al. |
| 2014/0170504 A1 | 6/2014 | Baek et al. |
| 2014/0186720 A1 | 7/2014 | Kintaka |
| 2014/0193695 A1 | 7/2014 | Hoshina et al. |
| 2014/0205910 A1 | 7/2014 | Weppner et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056500 A1 | 2/2016 | Holme et al. |
| 2016/0087321 A1 | 3/2016 | Wöhrle et al. |
| 2016/0111751 A1* | 4/2016 | Badding ............... C04B 35/50 |
| | | 429/322 |
| 2016/0149260 A1 | 5/2016 | Badding et al. |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0229701 A1 | 8/2016 | Heine et al. |
| 2016/0240887 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2016/0375607 A1 | 12/2016 | Badding et al. |
| 2017/0005367 A1 | 1/2017 | Van Berkel et al. |
| 2017/0022112 A1 | 1/2017 | Karpenko et al. |
| 2017/0054139 A1 | 2/2017 | Kerkamm |
| 2017/0062873 A1 | 3/2017 | Iyer et al. |
| 2017/0162901 A1 | 6/2017 | Chen et al. |
| 2017/0183265 A1 | 6/2017 | Badding et al. |
| 2017/0210634 A1 | 7/2017 | Badding et al. |
| 2017/0214048 A1 | 7/2017 | Qian et al. |
| 2017/0214084 A1 | 7/2017 | Lei et al. |
| 2018/0069263 A1 | 3/2018 | Holme et al. |
| 2018/0301754 A1 | 10/2018 | Badding et al. |
| 2018/0375149 A1 | 12/2018 | Beck et al. |
| 2019/0207252 A1 | 7/2019 | Badding et al. |
| 2019/0214678 A1 | 7/2019 | Hwang et al. |
| 2019/0245178 A1 | 8/2019 | Cao et al. |
| 2019/0260073 A1 | 8/2019 | Chao et al. |
| 2019/0363398 A1 | 11/2019 | Badding et al. |
| 2020/0031014 A1 | 1/2020 | Badding et al. |
| 2020/0309454 A1 | 10/2020 | Kamei et al. |
| 2021/0047243 A1 | 2/2021 | Badding et al. |
| 2021/0380430 A1 | 12/2021 | Badding et al. |
| 2021/0402646 A1 | 12/2021 | Badding et al. |

FOREIGN PATENT DOCUMENTS

| | | |
|---|---|---|
| CN | 102010183 A | 4/2011 |
| CN | 102280659 A | 12/2011 |
| CN | 103117413 A | 5/2013 |
| CN | 109 378 525 A | 2/2019 |
| EP | 3599068 A1 | 1/2020 |
| EP | 3408246 B1 | 2/2020 |
| JP | H02-111658 A | 4/1990 |
| JP | 2000-128629 | 5/2000 |
| JP | 2004-63261 A | 2/2004 |
| JP | 2006-8488 | 1/2006 |
| JP | 2012-031025 | 2/2012 |
| JP | 2012-224520 A | 11/2012 |
| JP | 2012-243743 | 12/2012 |
| JP | 2013-107779 | 6/2013 |
| JP | 2013-134852 | 7/2013 |
| JP | 2013-214421 | 10/2013 |
| JP | 2014-2965 A | 1/2014 |
| JP | 2015-130481 A | 7/2015 |
| JP | 2015-215998 | 12/2015 |
| WO | WO 81/02196 A1 | 8/1981 |
| WO | WO 2009/038674 A2 | 3/2009 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2016/069749 | 5/2016 |
| WO | WO 2017/131676 A1 | 8/2017 |
| WO | WO 2017/197406 A1 | 11/2017 |
| WO | WO 2018/075972 A1 | 4/2018 |

(56) References Cited

FOREIGN PATENT DOCUMENTS

| WO | WO 2018/236394 A1 | 12/2018 |
|---|---|---|
| WO | WO 2019/090360 A1 | 5/2019 |
| WO | WO 2020/081718 A1 | 4/2020 |
| WO | WO/2020/236767 A1 | 11/2020 |
| WO | WO 2021/146633 A1 | 7/2021 |

OTHER PUBLICATIONS

Cheng J. et al., "On the green density sintering behavior and electrical property of tape cast $Ce_{0.9}Gd_{0.1}O_{1.95}$ electrolyte films", Materials Research Bulletin, Dec. 1, 2002, vol. 37, No. 15, pp. 2437-2446, XP004395782.

Gurauskis et al., "Laser drilling of Ni—YSZ cermets", Journal of the European Ceramic Society, Oct. 1, 2008, vol. 28, No. 14, pp. 2671-2680, XP023610743.

Rauscher et al. "Steel-sheet fabrication by tape casting, Low Temperature Cofired Ceramics LTCC View project Colloidal Processing View project", International Journal of Powder Metallurgy, vol. 44, No. 6, 2008, 11 pages.

Agrawal et al., "Solid polymer electrolytes: materials designing and all-solid-state battery applications: an overview", Journal of Physics D: Applied Physics 41, 2008, 223001, 18 pages.

Ahmad et al., "Concentration and mobility of mobile $Li^+$ ions in $Li_6BaLa_2Ta_2O_{12}$ and $Li_5La_3Ta_2O_{12}$ garnet lithium ion conductors," J Mater Sci: Mater Electron, 2015, vol. 26, pp. 8136-8142.

Ahmad, Mohamad, "Lithium ionic conduction and relaxation dynamics of spark plasma sintered $Li_5La_3Ta_2O_{12}$ garnet nanoceramics", Ahmad Nanoscale Research Letters, 2015, 10:58, DOI: 10.1186/s11671-015-0777-7, 10 pages.

Ahn et al., "Local impedance spectroscopic and microstructural analyses of Al-in-diffused $Li_7La_3Zr_2O_{12}$," Journal of Power Sources, 2014, vol. 254, pp. 287-292.

Allen et al., "Effect of substitution (Ta, Al, Ga) on the conductivity of $Li_7La_3Zr_2O_{12}$", issued on Journal of Power Sources 2012, vol. 206, pp. 315-319.

Arora et al., "Battery Separators", Chemical Reviews, 2004, vol. 104, pp. 4419-4462.

Baek et al., "Garnet related lithium ion conductor processed by spark plasma sintering for all solid state batteries," Journal of Power Sources, 2014, vol. 249, pp. 197-206.

Baggetto et al., "High Energy Density All-Solid-State Batteries: A Challenging Concept Towards 3D Integration", Advanced Functional Materials, 2008, vol. 18, pp. 1057-1066.

Bernuy-Lopez et al., "Atmosphere Controlled Processing of Ga-Substituted Garnets for High Li-Ion Conductivity Ceramics," Chem. Mater. 2014, vol. 26, pp. 3610-3617.

Bonderer et al., "Free-Standing Ultrathin Ceramic Foils," Journal of the American Ceramic Society, 2010, vol. 93, No. 11, pp. 3624-3631.

Bruce et al.,"$Li$—$O_2$ and Li—S batteries with high energy storage", Nature Materials, Jan. 2012, vol. 11, pp. 19-29.

Buschmann et al. "Lithium metal electrode kinetics and ionic conductivity of the solid lithium ion conductors "$Li_7La_3Zr_2O_{12}$" and $Li_{7-x}La_3Zr_{2-x}Ta_xO_{12}$ with garnet-type strucutre," Journal of Power Sources, 2012, vol. 206, pp. 236-244.

Buschmann et al., "Structure and dynamics of the fast lithium ion conductor $Li_7La_3Zr_2O_{12}$", Phys. Chem. Chem. Phys., 2011, vol. 13, pp. 19378-19392.

Cao et al., "Effect of Sb—Ba codoping on the ionic conductivity of $Li_7La_3Zr_2O_{12}$ ceramic," Ceramics International, 2015, vol. 41, pp. 6232-6236.

Chen et al., "Origin of High Li+ Conduction in Doped $Li_7La_3Zr_2O_{12}$ Garnets," Chemistry of Materials, 2015, vol. 27, pp. 5491-5494.

Chen et al., "Sol-gel derived Li—La—Zr—O thin films as solid electrolytes for lithium-ion batteries", Journal of Materials Chemistry A, 2014, vol. 2, pp. 13277-13282.

Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.

Cheng et al., "Effect of Surface Microstructure on Electrochemical Performance of Garnet Solid Electrolytes," ACS Appl. Mater. Interfaces, 2015, vol. 7, pp. 2073-2081.

Cheng et al., "Interrelationships among Grain Size, Surface Composition Air Stability, and Interfacial Resistance of Al-Substitued $Li_7La_3Zr_2O_{12}$ Solid Electrolytes," ACS Appl. Mater. Interfaces, 2015, vol. 7, pp. 17649-17655.

Cheng et al., "The origin of high electrolyte-electrode interfacial resistances in lithium cells containing garnet type solid electrolytes," Phys. Chem. Chem. Phys., 2014, vol. 16, pp. 18294-18300.

David et al., "Microstructure and Li-Ion Conductivity of Hot-Pressed Cubic $Li_7La_3Zr_2O_{12}$", J. Am. Cerami. Soc., 2015, pp. 1-6; DOI: 10.1111/jace.13455.

Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.

Dhivya et al., "Effect of Simultaneous Substitution of Y and Ta on the Stabilization of Cubic Phase, Microstructure, and $Li^+$ Conductivity of $Li_7La_3Zr_2O_{12}$ Lithium Garnet," ACS Appl. Mater. Interfaces, 2014, vol. 6, pp. 17606-17615.

Dhivya et al., "$Li^+$ transport properties of W substituted $Li_7La_3Zr_2O_{12}$ cubic lithium garnets," AIP Advances, 2013, vol. 3, pp. 082115.1-082115.21.

Djenadic, Ruzica et al., "Nebulized spray pyrolysis of Al-doped $Li_7La_3Zr_2O_{12}$ solid electrolyte for battery applications," Solid State Ionics, Oct. 2014, vol. 263, pp. 49-56.

Dong et al., "Electrochemical perofmrance and lithium-ion insertion/extraction mechanism studies of the novel $Li_2ZrO_3$ anode materials," Electrochimica Acta, 2015, vol. 161, pp. 219-225.

Duvel, Andre, et al., "Mechanosynthesis of Solid Electrolytes: Preparation, Characterization, and Li Ion Transport Properties of Garnet-Type Al-Doped $Li_2La_3Zr_2O_{12}$ Crystallizing with Cubic Symmetry," The Journal of Physical Chemistry, 2012, vol. 116, pp. 15192-15202.

English translation of the office action of Chinese application No. 201480055386.4 dated of Jan. 4, 2017; 9 pages.

Extended European Search Report dated Feb. 22, 2017 for European application No. 14864783.7; 9 pages.

Ferrese et al., "Lithium Redistribution in Lithium-Metal Batteries", Journal of The Electrochemical Society, 2012, vol. 159, pp. A1615-A1623.

Fries, R. et al., "Fabrication and properties of an anisotropic PZT/Polymer 0-3 composite," J. Mater. Sci.: Mater. in Electronics, 1994, vol. 5, pp. 238-243.

Fu et al., "Stabilizing the Garnet Solid-Electrolyte/Polysulfide Interface in Li—S Batteries", Chemistry of Materials, vol. 29, No. 19, Sep. 26, 2017, pp. 8037-8041.

Fu et al., "Toward Garnet electrolyte-based Li metal batteries: An ultrathin, highly effective, artificial solid-state electrolyte/metallic Li interface", Science Advances, vol. 3, No. 4, Apr. 7, 2017, pp. 1-11.

Geiger et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Gorte et al., "Anodes for Direct Oxidation of Dry Hydrocarbons in a Solid-Oxide Fuel Cell", Advanced Materials, Oct. 2, 2000, vol. 12, No. 19, pp. 1465-1469.

Gu et al., "Effects of penta-and trivalent dopants on structures and conductivity $Li_7La_3Zr_2O_{12}$," Solid State Ionics, 2015, vol. 274, pp. 100-105.

Han et a., "Experimental visualization of lithium conduction pathways in garnet-type $Li_7La_3Zr_2O_{12}$", Chem. Commun., 2012, vol. 48, pp. 9840-9842.

(56) References Cited

OTHER PUBLICATIONS

Hayashi et al., "New Phases in $La_2O_3$—$Li_2O$-$Ta_2O_5$ System", Mat. Res. Bull. 1986, vol. 21, No. 3, pp. 289-293.
Herrmann et al., "Micro-segregation in liquid phase sintered silicon carbide ceramics," Journal of the European Ceramic Society, Apr. 1, 2010, vol. 30, pp. 1495-1501.
Hitz et al., "Highly Li-Stuffed Garnet-Type $Li_{7+x}La_3Zr_{2-x}Y_xO_{12}$", Journal of The Electrochemical Society, 2013, vol. 160, No. 8, pp. A1248-A1255.
Hyooma et al.,("Crystal Structures of $La_3Li_5M_2O_{12}$ (M=Nb, Ta)", Mat. Res. Bull. 1988, vol. 23, No. 10, pp. 1399-1407.
International Search Report and Written Opinion dated Apr. 15, 2016 in PCT/US2016/015209, 14 pages.
International Search Report and Written Opinion dated Dec. 1, 2016 in PCT/US2016/043428, 11 pages.
International Search Report and Written Opinion dated Mar. 10, 2015 in PCT/US2014/059578, 15 pages.
International Search Report and Written Opinion dated Mar. 23, 2015 in PCT/US2014/059575, 16 pages.
Ishiguro et al., "Stability of Nb-Doped Cubic $Li_7La_3Zr_2O_2$ with Lithium Metal," Journal of the Electrochemical Society, 2013, vol. 160, No. 10, pp. A1690-A1693.
Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 248, 2014, pp. 943-950.
Jalem et al., "Effects of Gallium doping in Garnet-Type $Li_7La_3Zr_2O_{12}$ Solid Electrolytes," Chemistry of Materials, 2015, vol. 27, pp. 2821-2831.
Jalem et al., "Insights into the Lithium-Ion Conduction Mechanism of Garnet-Type Cubic $Li_5La_3Ta_2O_{12}$ by ab-initio Calculations," J. Phys. Chem. C 2015, vol. 119, pp. 20783-20791.
Janani et al., "Influence of sintering additives on densification and $Li^+$ conductivity of Al doped $Li_7La_3Zr_2O_{12}$ lithium garnet," RSC Adv. 2014, vol. 4, pp. 51228-51238.
Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace.13578.
Jin et al., "Al-doped $Li_7La_3Zr_2O_2$ synthesized by a polymerized complex method," Journal of Power Sources, 2011, vol. 196, pp. 8683-8687.
Jung et al., "Ceramic separators based on Li+-conducting inorganic electrolyte for high-performance lithium-ion batteries with enhanced safety," Journal of Power Sources, 2015, vol. 293, pp. 675-683.
Kang et al., "First-Principles Study of Chemical Stability of Lithium Oxide Garnets $Li_7La_3M_2O_{12}$ (M=Zr, Sn, or Hf)," The Journal of Physical Chemistry C, 2014, vol. 118 (31), pp. 17402-17406.
Kato et al., "Preparation of thick-film electrode-solid electrolyte composites on $Li_7La_3Zr_2O_{12}$ and their electrochemical properties," Journal of Power Sources, 303, 2016, pp. 65-72.
Katsui et al., "Preparation of cubic and tetragonal $Li_7La_3Zr_2O_{12}$ flim by metal organic chemical vapor deposition," Thin Solid Films, vol. 584, Jun. 1, 2015, pp. 130-134.
Kc et al., "Point defects in garnet-type solid electrolyte (c- $Li_7La_3Zr_2O_{12}$) for Li-ion batteries," Solid State Ionics, 2014, vol. 261, pp. 100-105.
Kerman et al. "Review—Practical Challenges Hindering the Development of Solid State Li Ion Batteries", Journal of the Electrochemical Society, 2017, vol. 164. No. 7, pp. A1731-1744.
Kerman et al., "Complex oxide nanomembranes for energy conversion and storage: A review ", Journal of Materials Research, vol. 29, No. 3, Feb. 14, 2014, pp. 320-337.
Kihira et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.
Kim et al., "Characterization of the interface between $LiCoO_2$ and $Li_7La_3Zr_2O_{12}$ in an all-solid-state rechargeable lithium battery," Journal of Power Sources, 2011, vol. 196, pp. 764-767.
Kim et al., "Epitaxial growth and lithium ion conductivity of lithium-oxide garnet for an all solid-state battery electrolyte\ ", Dalton Transactions, 2013, vol. 42, pp. 13112-13117.
Kim et al., "The Effect of Relative Density on the Mechanical Properties of Hot-Pressed Cubic $Li_7La_3Zr_2O_{12}$," J. Am. Ceram. Soc., 2016, pp. 1-8.; DOI: 10.1111/jace.14084.
Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.
Kokal et al., "Preparation and characterization of three dimensionally ordered macroporous $Li_7La_3Zr_2O_{12}$ by colloidal crystal templating for all-solid-state lithium-ion batteries," Ceramics International, 2015, vol. 41, pp. 737-741.
Kokal et al., "Sol-gel synthesis and lithium ion conductivity of $Li_7La_3Zr_2O_{12}$ with garnet-related type structure," Solid State Ionics, 2011, vol. 185, pp. 42-46.
Kong et al., "Transparent Ceramics, Topics in Mining," Springer International Publishing Switzerland, 2015, Metallurgy and Materials Engineering, DOI 10.1007/978-3-319-18956-7_2; pp. 29-91.
Kotobuki et al., "Compatibility of $Li_7La_3Zr_2O_{12}$ Solid Electrolyte to All-Solid-State Battery Using Li Metal Anode", Journal of the Electrochemical Society, 2010, vol. 157, No. 10, pp. A1076-A1079.
Kotobuki et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.
Kotobuki et al., "Fabrication of all-solid-state lithium battery with lithium metal anode using $Al_2O_3$-added $Li_7La_3Zr_2O_{12}$ solid electrolyte," Journal of Power Sources, 2011, vol. 196, pp. 7750-7754.
Lai et al., "Ultrahigh-Energy-Density Microbatteries Enabled by New Electrode Architecture and Micropackaging Design," Adv. Mater., 2010, vol. 22, pp. E139-E144.
Lallemant et al., "Transparent polycrystalline alumina obtained by SPS: Green bodies processing effect," Journal of the European Ceramic Society, 2012, vol. 32, pp. 2909-2915.
Langer et al., "Syntheis of single phase cubic Al-substituted $Li_7La_3Zr_2O_{12}$ by solid state lithiation of mixed hydroxides,"Journal of Alloys and Compounds, 2015, vol. 645, pp. 64-69.
Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.
Lee et al., "High lithium ion conductivity of $Li_7La_3Zr_2O_{12}$ synthesized by solid state reaction," Solid State Ionics, 2014, vol. 258, pp. 13-17.
Li et al., "Optimizing Li conductivity in a garnet framework," J. Mater. Chem., 2012, vol. 22, pp. 15357-15361.
Li et al., "The reaction of $Li_{6.5}La_3Zr_{1.5}Ta_{0.5}O_{12}$ with water," Solid State Ionics, 2015, vol. 269, pp. 57-61.
Li et al., "W-Doped $Li_7La_3Zr_2O_{12}$ Ceramic Electrolytes for Solid State Li-ion Batteries," Electrochimica Acta, 2015, vol. 180, pp. 37-42.
Liu et al., "High Ion Conductivity in Garnet-type F-doped $Li_7La_3Zr_2O_{12}$ ," Journal of Inorganic Materials, Sep. 2015, vol. 30, No. 9, pp. 995-1001.
Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.
Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.
Matsuda et al., "Phase formation of a garnet-type lithium-ion conductor $Li_{7-3x}Al_xLa_3Zr_2O_{12}$," Solid State Ionics, 2015, vol. 277, pp. 23-29.
Matsui et al., "Phase stability of a garnet-type lithium ion conductor $Li_7La_3Zr_2O_{12}$," The Royal Society of Chemistry, Dalton Transactions, 2014, vol. 43, pp. 1019-1024.
Matsui et al., "Phase transformation of the garnet structured lithium ion conductor: $Li_7La_3Zr_2O_{12}$", Solid State Ionics, 2014, vol. 262, pp. 155-159.

(56) References Cited

OTHER PUBLICATIONS

Mccloskey et al., "On the Mechanism of Nonaqueous $Li-O_2$ Electrochemistry on C and Its Kinetic Overpotentials: Some Implications for Li-Air Batteries", J. Phys. Chemistry C, 2012, vol. 116, pp. 23897-23905.
Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \le x \le 0.375$, $0 \le y \le 1$) Superionic Conductor: A First Principles Investigation," Chem. Mater. 2013, vol. 25, pp. 3048-3055.
Miara et al., "First-Principles Studies on Cation Dopants and Electrolyte|Cathode Interphases for Lithium Garnets," Chemestry of Materials, 2015, vol. 27, pp. 4040-4047.
Minami et al., "Crystallization Process for Superionic $Li_7P_3S_{11}$ Glass-Ceramic Electrolytes", Journal of the American Ceramic Society, 2011, vol. 94, pp. 1779-1783.
Mitterdorfer et al., "Fabrication of thin electrolytes for second-generation solid oxide fuel cells," Solid State Ionics, 2000, vol. 131, pp. 79-96.
Miyauchi et al., "New Amorphous Thin Films of Lithium Ion Conductive Solid Electrolyte," Solid State Ionics 9 & 10, 1983, pp. 1469-1472.
Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.
Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.
Mukhopadhyay et al., "Structure and Stoichiometry in Supervalent Doped $Li_7La_3Zr_2O_{12}$," Chem. Mater., 2015, vol. 27, pp. 3658-3665.
Murugan et al., "Schnelle Lithiumionenleitung in granatartigem $Li_7La_3Zr_2O_{12}$", Angew. Chem., 2007, vol. 119, pp. 7925-7928, with English translation—"Fast Lithium Ion Conduction in Garnet-Type $Li_7La_3Zr_2O_{12}$", Angew. Chem. Int. Ed., 2007, vol. 46, pp. 7778-7781.
Narayanan et al., "Dopant Concentration-Porosity-Li-Ion Conductivity Relationship in Garnet-Type $Li_{5+2x}La_3Ta_{2-x}Y_xO_{12}$ ($0.05 \le x \le 0.75$) and Their Stability in Water and 1 M LiCl," Inorganic Chemistry, 2015, vol. 54, pp. 6968-6977.
Nemori et al., "Stability of garnet-type solid electrolyte $Li_xLa_3A_{2-y}B_yO_{12}$ (A=Nb or Ta, B=Sc or Zr)," Solid State Ionics, 2015, vol. 282, pp. 7-12.
Neudecker et al., "'Lithium-Free' Thin-Film Battery with In Situ Plated Li Anode," Journal of The Electrochemical Society, 2000, vol. 147, No. 2, pp. 517-523.
Ni et al., "Room temperature elastic moduli and Vickers hardness of hot-pressed LLZO cubic garnet," J. Mater. Sci., 2012, vol. 47, pp. 7978-7985.
Nyman et al., "Alternative Approach to Increasing Li Mobility in Li—La—Nb/Ta Garnet Electrolytes," Chem. Mater., 2010, vol. 22, No. 19, pp. 5401-5410.
Office Action of Chinese application No. 201480055387.9 dated Dec. 22, 2016 together with English translation; 7 pages.
Office Action of Japanese application No. 2016-520586 dated Nov. 28, 2017 together with English translation; 8 pages.
Ohta et al., "Co-sinterable lithium garnet-type oxide electrolyte with cathode for all-solid-state lithium ion battery," Journal of Power Sources, 2014, vol. 265, pp. 40-44.
Ohta et al., "High lithium ionic conductivity in the garnet-type oxide $Li_{7-x}La_3(Zr_{2-x}, Nb_x)O_{12}$ (X=0-2)," Journal of Power Sources, 2011, vol. 196, pp. 3342-3345.
Ohta et al., "All-solid-state lithium ion battery using garnet-type oxide and $Li_3BO_3$ solid electrolytes fabricated by screen-printing," Journal of Power Sources, 2013, vol. 238, pp. 53-56.
Ohta et al., "Electrochemical performance of an all-solid-state lithium ion battery with garnet-type oxide electrolyte," Journal of Power Sources, vol. 202, 2012, pp. 332-335.

Onodera et al., "Flux Growth of Idiomorphic Garnet-Type Solid Electrolyte Crystals for All-Solid-State Lithium-Ion Rechargeable Batteries," The Electrochemical Society, 2012, Abstract #1198, 1 page.
Park et al., "Effects of crystallinity and impurities on the electrical conductivity of Li—La—Zr—O thin films," Thin Solid Films, 2015, vol. 576, pp. 55-60.
Peng et al., "A Reversible and Higher-Rate $Li-O_2$ Battery", Science, Aug. 3, 2012, vol. 337, pp. 563-567.
Puech et al., "Elaboration and characterization of a free standing LiSICON membrane for aqueous lithiumair battery," Journal of Power Sources, vol. 214, 2012, pp. 330-336.
Quartarone et al., "Electrolytes for solid-state lithium rechargeable batteries: recent advances and perspectives", Chemical Society Reviews, vol. 40, 2011, pp. 2525-2540.
Ramakumar et al., "Structure and LI+ dyanmics of Sb-doped $Li_7La_3Zr_2O_{12}$ fast lithium ion conductors," Phys. Chem. Chem. Phys. 2013, vol. 15, pp. 11327-11338.
Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.
Rangasamy et al., "A High Conducting Oxide—Sulfide Composite Lithium Superionic Conductor," J. Mater. Chem. A, published 2014, vol. 2, pp. 4111-4116.
Rangasamy et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.
Rangasamy et al., "The role of Al and Li concentration on the formation of cubic garnet solid electrolyte of nominal composition $Li_7La_3Zr_2O_{12}$," Solid State Ionics, 2012, vol. 206, pp. 28-32.
Rao et al., "In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.
Raskovalov et al., "Structure and transport properties of $L1_7La_3Zr_{2-0.75x}Al_xO_{12}$ supersonic solid electrolytes," Journal of Power Sources, 2013, vol. 238, pp. 48-52.
Reed, James S., Principles of Ceramics Processing, 2nd Edition, John Wiley & Sons, Inc., New York, Jan. 1995, pp. 60-61.
Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.
Ren et al., "Direct observation of lithium dendrites inside garnet-type lithium-ion solid electrolyte," Electrochemistry Communications, 2015, vol. 57, pp. 27-30.
Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.
Rettenwander et al., "Site Occupation of Ga and Al in Stabilized Cubic $Li_{7-3(x+y)}Ga_xAl_yLa_3Zr_2O_{12}$ Garnets As Deduced from $_{27}Al$ and $_{71}Ga$ MAS NMR at Ultrahigh Magnetic Fields," Chemistry of Materials, 2015, vol. 27, pp. 3135-3142.
Rettenwander et al., "Synthesis, Crystal Chemistry, and Electrochemical Properties of $Li_{7-2x}La_3Zr_{2-x}Mo_xO_{12}$ (x=0.1-0.4): Stabilization of the Cubic Garnet Polymorph via Substitution of $Zr^{4+}$ by $Mo^{6+}$," Inorganic Chemistry, 2015, vol. 54, pp. 10440-10449.
Rettenwander et al., "DFT study of the role of $Al^{3+}$ in the fast ion-conductor $Li_{7-3x}Al^{3+}_xLa_3Zr_2O_{12}$ Garnet," Chem. Mater. 2014, vol. 26, pp. 2617-2623.
Rosero-Navarro et al., "Preparation of $Li_7La_3(Zr_{2-x},Nb_x)O_{12}$ (x=0-1.5) and $Li_3BO_3/LiBO_2$ composites at low temperatures using a sol-gel process," Solid State Ionics, 2016, vol. 285, pp. 6-12.
Sakamoto et al., "Synthesis of nano-scale fast ion conducting cubic $Li_7La_3Zr_2O_{12}$", Nanotechnology, 2013, vol. 24, 424005, 8 pages.
Sakamoto, Jeff, "Garnet-based ceramic electrolyte: Enabling Li metal anodes and solid state batteries," Beyond Lithium Ion VI, Jun. 4-6, 2013, Boulder, CO., 36 pages.
Sakuda et al., "Evaluation of elastic modulus of $Li_2S$—$P_2S_5$ glassy solid electrolyte by ultrasonic sound velocity measurement and compression test", Journal of the Ceramic Society of Japan 121, 2013, pp. 946-949.

(56) References Cited

OTHER PUBLICATIONS

Schafbauer et al., "Tape Casting as a Multi Purpose Shaping Technology for Different Applications in Energy Issues", Materials Science Forum vols. 706-709, 2012, pp. 1035-1040.

Schmidt et al., "In-situ, non-destructive acoustic characterization of solid state electrolyte cells", Journal of Power Sources, 2016, vol. 324, pp. 126-133.

Second Office Action of Chinese Application No. 201480055386.4 dated Nov. 1, 2017 together with English translation, 10 pages.

Sharafi et al., "Characterizing the Li—$Li_7La_3Zr_2O_{12}$ interface stability and kinetics as a function of temperature and current density," Journal of Power Sources, 2016, vol. 302, pp. 135-139.

Shimonishi et al., "Synthesis of garnet-type $Li_{7-x}La_3Zr_2O_{12-1/2x}$ and its stability in aqueous solutions," Solid State Ionics, 2011, vol. 183, pp. 48-53.

Shin et al., "Synergistic multi-doping effects on the $Li_7La_3Zr_2O_{12}$ solid electrolyte for fast lithium ion conduction," Scientific Reports, 5:18053; DOI: 10.1038/srep18053, 2015, pp. 1-9.

Song et al., "Crystal structure, migration mechanism and electrochemical performance of Cr-stabilized garnet," 2014, vol. 268, pp. 135-139.

Suárez et al., "Sintering to Transparency of Polycrystalline Ceramic Materials", Mar. 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.

Sudo et al., "Interface behavior between garnet-type lithium-conducting solid electrolyte and lithium metal," Solid State Ionics, 2014, vol. 262, pp. 151-154.

Suzuki et al., "Transparent cubic garnet-type solid electrolyte of $Al_2O_3$-doped $Li_7La_3Zr_2O_{12}$," Solid State Ionics, 2015, vol. 278, pp. 172-176.

Tadanaga et al., "Low temperature synthesis of highly ion conductive $Li_7La_3Zr_2O_{12}$—$Li_3BO_3$ composites," Electrochemistry Communications, 2013, vol. 33, pp. 51-54.

Takada, "Progress and prospective of solid-state lithium batteries", Acta Materialia 61, 2013, pp. 759-770.

Takeda et al., "High Pressure Form of Fluoride Garnets $Na_3M_2Li_3F_{12}$ (M=& Fe)," Mat. Res. Bull., 1977, vol. 12, No. 7, pp. 689-692.

Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.

Teng, Shiang, et al., "Recent Developments in garnet based solid state electrolytes for thin film batteries," Current Opinion in Solid State and Materials Science, Feb. 2014, vol. 18, Issue 18, pp. 29-38.

Thangadurai et al., "Fast Solid-State Li Ion Conducting Garnet-Type Structure Metal Oxides for Energy Storage," J. Phys. Chem. Lett, 2015, vol. 6, pp. 292-299.

Thangadurai et al., "$Li_6ALa_2N\ O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.

Thangadurai et al., "Novel Fast Lithium Ion Conduction in Garnet-Type $Li_5La_3M_2O_{12}$ (M=NB, Ta)," J. Am. Ceram. Soc., 2003, vol. 86, No. 3, pp. 437-440.

Thangadurai et al., "Garnet-type solid-state fast Li ion conductors for Li batteries: critical review", Chemical Society Reviews, 2014, vol. 43, pp. 4714-4727.

Thompson et al., "A Tale of Two Sites: On Defining the Carrier Concentration in Garnet-Based Ionic Conductors for Advanced Li Batteries," Adv. Energy Mater., 2015, 1500096, pp. 1-9.

Toda, S., et al., "Low temperature cubic garnet-type $CO_2$-doped $Li_7La_3Zr_2O_{12}$," Solid State Ionics, 2013, vol. 233, pp. 102-106.

Tong et al., "Highly Conductive Li Garnets by a Multielement Doping Strategy", Inorganic Chemistry, 2015, vol. 54, pp. 3600-3607.

Ulissi, Ulderico et al., "All solid-state battery using layered oxide cathode, lithium-carbon composite anode and thio-LISICON electrolyte," Solid State Ionics, vol. 296, 2016, pp. 13-17.

Wainwright et al., "Forces generated by anode growth in cylindrical Li/$MoS_2$ cells," Journal of Power Sources, 1991, vol. 34, pp. 31-38.

Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.

Wang et al., "The synergistic effects of al and Te on the structure and LI+-mobility of garnet-type solid electrolytes", J. Mater. Chem. A. 2014, vol. 2, pp. 20271-20279.

Wang et al., "Transparent ceramics: Processing, materials and applications," Progress in Solid State Chemistry, 2013, vol. 41, pp. 20-54.

Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.

Wang, Shutao et al., "Syntheses and structures of lithium zirconates for high-temperature $CO_2$ absorption," J. Mater. Chem. A, 2013, vol. 1, pp. 3540-3550.

Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.

Wilkinson et al., "Effects of physical constraints on Li cycability," Journal of Power Sources, 1991, vol. 36, pp. 517-527.

Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.

Wolfenstine et al., "Chemical stability of cubic $Li_7La_3Zr_2O_{12}$ with molten lithium at elevated temperature", J. Mater. Sci., 2013, vol. 48, pp. 5846-5851. DOI 10.1007/s10853-013-7380-z.

Xie et al., "Lithium Distribution in Aluminum-Free Cubic $Li_7La_3Zr_2O_{12}$", issued on Chem. Mater. 2011, vol. 23, pp. 3587-3589.

Xie et al., "Low-temperature synthesis of $Li_7La_3Zr_2O_{12}$ with cubic garnet-type structure," Materials Research Bulletin, 2012, vol. 47, pp. 1229-1232.

Xu et al., "Multistep sintering to synthesize fast lithium garnets," Journal of Power Sources, 2016, vol. 302, pp. 291-297.

Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J.Physical Chemistry C, 2015, vol. 119, pp. 14947-14953.

Yi et al., "Flame made nanoparticles permit processing of dense, flexible, Li+ conducting ceramic electrolyte thin films of cubic-$Li_7La_3Zr_2O_{12}$ (c-LLZO)", J. Mater. Chem. A, 2016, vol. 4, pp. 12947-12954.

Yi et al., "Key parameters governing the densification of cubic-$Li_7La_3Zr_2O_{12}$+conductors", Journal Of Power Sources, Elsevier SA, CH, vol. 352, Mar. 31, 2017, pp. 156-164.

Yoshima et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.

Zaiss et al., "Fast ionic conduction in cubic hafnium garnet $Li_7La_3Hf_2O_{12}$," Ionics, Springer-Verlag, 2010, vol. 16, pp. 855-858.

Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.

Zhang et al., "Field assisted sintering of dense Al-substituted cubic phase $Li_7La_3Zr_2O_{12}$ solid electrolytes", Journal of Power Sources, 2014, vol. 268, pp. 960-964.

Zhang et al., "Preparation of cubic $Li_7La_3Zr_2O_{12}$ solid electrolyte using a nano-sized core-shell structured precursor", Journal of Alloys and Compounds, 2015, vol. 644, pp. 793-798.

Cheng et al., "Measurement of the Sintering Pressure in Ceramic Films", J. Am. Ceram. Soc., 1988, vol. 71, No. 4, pp. 276-280.

Cologna et al., "Effect of Al and Ce doping on the deformation upon sintering in sequential tape cast layers for solid oxide fuel cells", Journal of Power Sources, vol. 193, 2009, pp. 80-85.

Cologna et al., "Vertical sintering to measure the uniaxial viscosity of thin ceramic layers", Acta Materialia, vol. 58, 2010, pp. 5558-5564.

Gotschel et al., "Processing of preceramic paper and ceramic green tape derived multilayer structures", Advances in Applied Ceramics, vol. 112, No. 6, 2013, pp. 358-365.

(56) References Cited

OTHER PUBLICATIONS

Han et al., "Control of shrinkage on the behavior of co-firing of ferrite and varistor multi-layers composite with organic content", J Electroceram, 2009, vol. 23, pp. 559-563.
Muralidharan et al., "Optimization of process parameters for the production of Ni—Mn—Co—Fe based NTC chip thermistors through tape casting route", Journal of Alloys and Compounds, 2011, vol. 509, pp. 9363-9371.
Yang et al., "Tape-casted transparent alumina ceramic wafers", J. Mater. Res., Oct. 14, 2014, vol. 29, No. 19, pp. 2312-2317.
Yu et al., "Experimental determination of the uniaxial viscosity of low-temperature co-fired ceramic tapes by vertical sintering", Ceramics International, 2014, vol. 40, pp. 9367-9375.
Reppert T. et al., "$Li_7La_3Zr_2D_{12}$ electrolyte for all-solid-state batteries", Future Energy, Oct. 17, 2014, pp. 1-1, XP055813972, Retrieved from the Internet: URL:https://juser.fz-juelich.de/record/171892/files/FZJ-2014-05448.pdf [retrieved on Jun. 15, 2021].
Reppert T. et al., "Oxide-ceramic electrolyte layers for all-solid-state lithium batteries", Jan. 21, 2015, pp. 1-1, XP055814028, Retrieved from the Internet: URL:https://juser.fz-juelich.de/record/188042/files/FZJ-2015-01520.pdf.
Olenick, "Ultra-Thin Flexible Ceramic Membranes for Electronic Applications", 46th International Symposium on Microelectronics (IMAPS 2013) | Sep. 30-Oct. 3, 2013 | Orlando, FL, USA; 5 pages.
Extended European search report of EP application No. 21187050.6 dated Jan. 7, 2022; 12 pages.
Hu et al., "Highly conductive paper for energy-storage devices", PNAS, Dec. 22, 2009, vol. 106, No. 51, pp. 21490-21494; www.pnas.org/cgi/doi/10.1073/pnas.0908858l0.
Wang et al., "A general method to synthesize and sinter bulk ceramics in seconds", Science 368, (2020) May 1, 2020, pp. 521-526.

\* cited by examiner

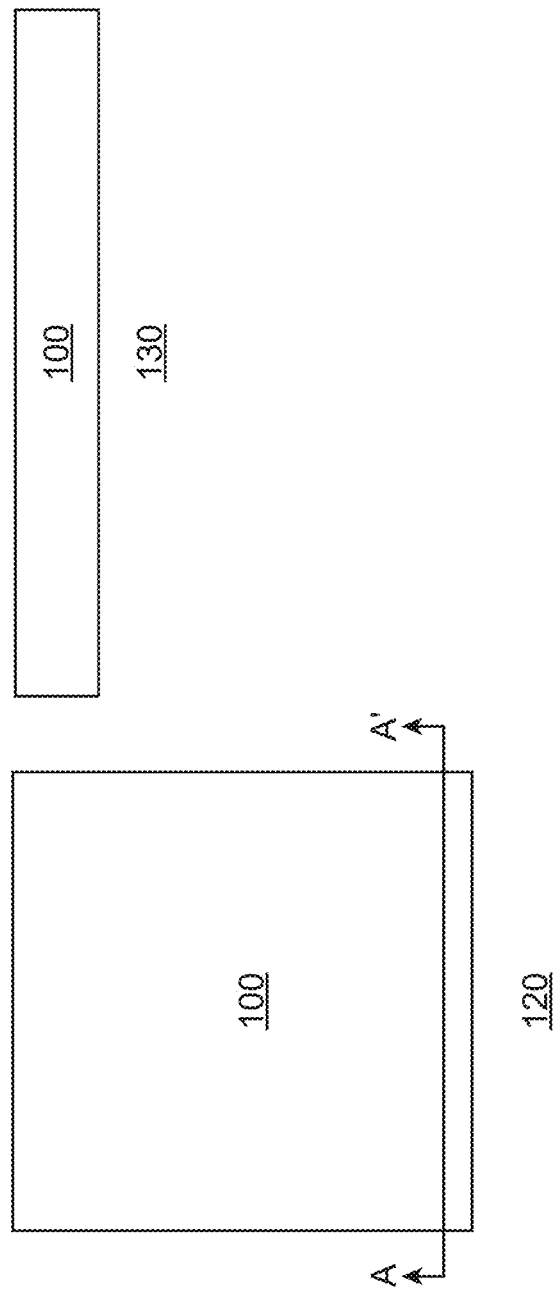

LITHIUM STUFFED GARNET SETTER PLATES FOR SOLID ELECTROLYTE FABRICATION

This application is a continuation of U.S. patent application Ser. No. 15/787,623, filed on Oct. 18, 2017, which is a Continuation of U.S. patent application Ser. No. 15/286,509, filed on Oct. 5, 2016, and which issued as U.S. Pat. No. 9,970,711 B2 on May 15, 2018; U.S. patent application Ser. No. 15/286,509 is a continuation of International Patent Application No. PCT/US2016/027886, filed on Apr. 15, 2016, titled LITHIUM STUFFED GARNET SETTER PLATES FOR SOLID ELECTROLYTE FABRICATION, and published as WO 2016/168691 A1, on Oct. 20, 2016, which claims priority to, and the benefit of, U.S. Provisional Patent Application No. 62/148,337, filed Apr. 16, 2015, titled LITHIUM STUFFED GARNET SETTER PLATES FOR SOLID ELECTROLYTE FABRICATION. The entire contents of the above listed applications are herein incorporated by reference in their entirety for all purposes.

BACKGROUND

Cleaner forms of storing energy are in great demand. Examples of clean energy storage include rechargeable lithium (Li) ion batteries (i.e., Li-secondary batteries), in which $Li^+$ ions move from a negative electrode to a positive electrode during discharge. In numerous applications (e.g., portable electronics and transportation), it would be advantageous to use a solid state Li ion battery which includes solid state materials such as solid state electrolytes as opposed to one that includes liquid components, (e.g., flammable liquid electrolytes). Using entirely solid state components improves battery safety and energy density, the latter of which is due in part to reduced electrode and electrolyte volume and weight.

Components of a solid state battery include the electrolyte, which electrically isolates the positive and negative electrodes, a catholyte, which is intimately mixed with a positive electrode active material to improve the ionic conductivity therein. A third component, in some Li ion batteries, is an anolyte which is laminated to, or in contact with, an anode material (i.e., negative electrode material; e.g., Li-metal). Currently available electrolyte, catholyte, and anolyte materials, however, are not stable within, or otherwise suitable for use with, solid state battery operating voltage ranges or when in contact with certain cathode or anode active materials such as lithium metal anodes.

Garnet (e.g., Li-stuffed garnet) is a class of oxides that has the potential to be suitable for use as one or more of a catholyte, an electrolyte, and an anolyte in a solid state battery. However, garnet materials have yet to be prepared with the proper morphology (e.g., thin film or nanostructured powder which can be sintered into sufficiently dense films or pellets), with sufficient conductivity or particle connectivity to function in commercial applications. Certain garnet materials and processing techniques are known (e.g., See U.S. Pat. Nos. 5,840,436; 8,658,317; 8,092,941; and 7,901,658; or U.S. Patent Application Publication Nos. 2013/0085055; 2011/0281175; 2014/0093785; 2014/0134483; 2015/0099190; 2014/0060723; 2009/0197172; 2010/00119800 and 2014/0170504; International Patent Application Publication Nos. WO 2010/0051345; 2010/096370 or also Bonderer, et al., Journal of the American Ceramic Society, 2010, 93(11):3624-3631; and Murugan, et al., Angew Chem. Int. Ed. 2007, 46, 7778-7781), but these materials and techniques suffer from a variety of deficiencies. The electrolyte films made by these techniques have insufficient $Li^+$ ion conductivity and/or cycle life at high current density and/or low temperatures for use in commercial applications, and these techniques are not compatible with many battery components.

Accordingly, there is a need for improved methods of making and processing solid electrolytes such as sintered lithium-stuffed garnet electrolytes.

SUMMARY

The present disclosure relates generally to the fabrication of components for lithium rechargeable batteries. Specifically, the present disclosure relates to the fabrication of setter plates which include lithium stuffed garnet oxides and to the use of these setter plates to sinter solid electrolytes or solid electrodes for lithium rechargeable batteries. In some examples, the setter plates described herein are useful for preparing thin, dense films of lithium-stuffed garnet oxides which are highly Li' ion conductive and have a low area-specific resistance (ASR).

The setter plates described herein reduce the chemical potential for Li to diffuse or migrate out of the sintering solid electrolyte (i.e., herein a "green film" before it is completely sintered) and into the setter plate or the surrounding atmosphere, thereby preserving the chemical composition of the sintered electrolyte. Furthermore, surprisingly, the thin film Li-stuffed garnet solid electrolytes produced using Li-stuffed garnet containing setter plates of a same, or similar, composition, and as set forth herein, have superior ionic conductivity, also superior mechanical integrity (e.g., lower areal crack density, lower variation in surface roughness), smaller and more uniform thicknesses, and also release from the setter plates post-sintering better than when compared to Li-stuffed solid electrolytes sintered between conventional setter plates which have a different chemical composition or Li activity than does the green film or the solid electrolyte formed therefrom once sintered.

The disclosure herein sets forth, inter alia, setter plates useful for fabricating solid electrolytes of a rechargeable battery. The setter plates described herein provide a surface, on top of which, a green film including lithium-stuffed garnets or the chemical precursors thereto may be sintered. In some examples, the setter plates described herein provide surfaces, between which, a green film including lithium-stuffed garnets or the chemical precursors thereto may be sintered. By sintering a green film using the setter plates set forth herein, the chemical composition of the sintering film is controlled. The chemical composition of the sintering film is controlled, in part, because the setter plates described herein maintain the appropriate Li activity or Li chemical potential between the sintering films and the setter plate in contact therewith. The chemical composition of the sintering film is controlled, in part, because the setter plates described herein maintain the appropriate Li activity or Li chemical potential between the sintering films and the atmosphere in contact therewith.

Also set forth herein are stacked, repeated units setter plates having green films therebetween which are useful for large scale processing of solid electrolytes. In some of these examples, each unit includes at least two setters and a green film positioned between the setters and in contact with each of the at least two setters. In some examples, several or more of these units, each which include two setters and a film in between the setters, are arranged in arrays. In some examples, the arrays are stacked. In some examples, the units are stacked into columns.

These setter plates are in some examples thin monoliths of a Li-stuffed garnet oxide characterized by the formula $Li_xLa_yZr_zO_t \cdot qAl_2O_3$, wherein $4<x<10$, $1<y<4$, $1<z<3$, $6<t<14$, and $0<q<1$. The value of subscript t is selected such that the garnet oxide characterized by the formula $Li_xLa_yZr_zO_t \cdot qAl_2O_3$ is charge neutral. Any subscript values not specified are limited to those subscript values which result in a charge neutral compound description. In some examples, q is 0.1. In some examples, q is 0.2. In some examples, q is 0.3. In some examples, q is 0.4. In some examples, q is 0.5. In some examples, q is 0.6. In some examples, q is 0.7. In some examples, q is 0.8. In some examples, q is 0.9. In some examples, q is 1.0. In some examples, q is 0.21. In some examples, q is 0.22. In some examples, q is 0.23. In some examples, q is 0.24. In some examples, q is 0.25. In some examples, q is 0.26. In some examples, q is 0.27. In some examples, q is 0.28. In some examples, q is 0.29. In some examples, q is 0.91. In some examples, q is 0.92. In some examples, q is 0.93. In some examples, q is 0.94. In some examples, q is 0.95. In some examples, q is 0.96. In some examples, q is 0.97. In some examples, q is 0.98. In some examples, q is 0.99. In certain examples, these setter plates have a surface defined by a first lateral dimension from about 5 cm to about 20 cm and a second lateral dimension from about 5 cm to about 20 cm; and a thickness from about 1 mm to about 100 mm. Depending on the dimensions of a given rechargeable battery for which the setter plate is used to make a sintered garnet electrolyte, these setter plates can be increased in size (e.g., surface area increased). For example, depending on the dimensions of a given rechargeable battery for which the setter plate is used to make a sintered garnet electrolyte, the setter side is about 10 cm by 7 cm, or also 4 cm by 4 cm, also up to 15 cm by 25 cm, or even up to 96 cm by 96 cm in order to prepare electrolytes having larger dimensions than the particular Examples and embodiments described herein. A variety of sizes of setter plates may be prepared in accordance with the features described herein.

Also set forth herein are methods of making setter plates. In some examples, the method of making a Li-stuffed garnet setter plate include mixing lithium-stuffed garnets and/or the chemical precursors thereto, to form a mixture, in proportions sufficient to produce, upon reaction, a Li-stuffed garnet compound having a composition of $Li_xLa_yZr_zO_t \cdot qAl_2O_3$, wherein $4<x<10$, $1<y<4$, $1<z<3$, $6<t<14$, and $0 \leq q \leq 1$. The subscripts x, y, z, and t, and the coefficient, q, are selected so that the compound is charge neutral. In some examples, the method further includes calcining the mixture. In certain examples, the method further includes milling the mixture before calcining the mixture. In some examples, the methods include milling the mixture after calcining the mixture. In some examples, the methods include milling the mixture before and after calcining the mixture. In some examples, the methods include forming (e.g., pressing) the milled precursor materials into a pellet or setter plate including the Li-stuffed garnet; placing the pellet or setter plate onto a substrate; sintering the pellet at a temperature of from 450° C. to 1300° C.; and optionally cooling the pellet in air at 1 atmosphere of pressure and 25° C. In some examples, the sintering is at a temperature of at least 1000° C. In some examples, the sintering is at a temperature of at least 1000° C. and less than 1300° C.

In some other examples of methods of making setter plates, the methods include the following steps. In a first step, garnet precursor chemicals are mixed to form a mixture. In some examples, during this first step, the garnet precursor chemicals are mixed with other oxide or oxide precursor chemicals to form a mixture. In a second step, the mixture is milled. In some examples, the mixture is milled to reduce the particle size and/or increase the surface area of the precursor chemicals. In some examples, the precursor chemicals are not calcined. In some examples, the mixture is formed into a form factor suitable for use as a setter plate. In some examples, the form factor is sintered to form a setter plate.

In some other examples, set forth herein are methods of using setter plates. Some of these methods of using a Li-stuffed garnet setter plate include fabricating a Li-stuffed garnet solid electrolyte for a rechargeable battery include placing unsintered Li-stuffed garnet precursor materials between two Li-stuffed garnet setter plates; and sintering the unsintered film between the two Li-stuffed garnet setter plates. In some examples, the unsintered Li-stuffed garnet precursor materials are unsintered films of garnet precursors, binders, dispersants, solvent, polymers, and combinations thereof, also known herein as green films which may be tape-cast or otherwise provided. Some of these methods of using a Li-stuffed garnet setter plate include fabricating a Li-stuffed garnet solid electrolyte for a rechargeable battery, placing and unsintered film of Li-stuffed garnet precursor materials on top of a Li-stuffed garnet setter plate, and sintering the unsintered film on top of the Li-stuffed garnet setter plate.

BRIEF DESCRIPTION OF THE DRAWINGS

FIG. 1B illustrates a plan view and a cross-sectional view of a Li-stuffed garnet setter plate of the present disclosure taken through line A-A' in FIG. 1B, in an embodiment.

Figure 1A:
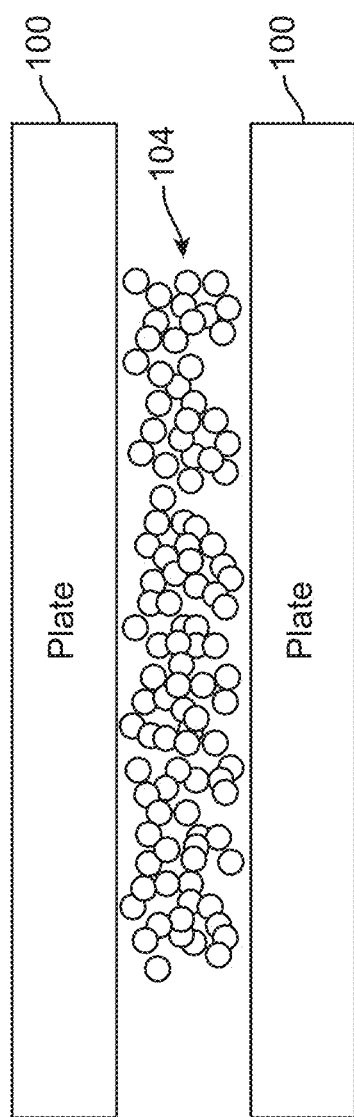
FIG. 1A illustrates setter plates and a method of using the setter plates in the preparation of battery materials, in an embodiment.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Definitions

U.S. Patent Application Publication No. U.S. 2015/0099190, which published Apr. 9, 2015 and was filed Oct. 7, 2014 as Ser. No. 14/509,029, is incorporated by reference herein in its entirety. This application describes Li-stuffed garnet solid-state electrolytes used in solid-state lithium rechargeable batteries. These Li-stuffed garnets generally having a composition according to $Li_A La_B M'_C M''_D Zr_E O_F$, $Li_A La_B M'_C M''_D Ta_E O_F$, or $Li_A La_B M'_C M''_D Nb_E O_F$, wherein $4<A<8.5$, $1.5<B<4$, $0 \leq C \leq 2$, $0 \leq D \leq 2$; $0 \leq E<2$, $10<F<13$, and M' and M'' are each, independently in each instance selected from Al, Mo, W, Nb, Sb, Ca, Ba, Sr, Ce, Hf, Rb, or Ta, or $Li_a La_b Zr_c Al_d Me''_e O_f$, wherein $5<a<8.5$; $2<b<4$; $0<c \leq 2.5$; $0 \leq d<2$; $0 \leq e<2$, and $10<f<13$ and Me'' is a metal selected from Nb, Ta, V, W, Mo, or Sb and as otherwise described in U.S. Patent Application Publication No. U.S. 2015/0099190. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (subscripts t1+t2+t3=subscript 2) so that the La:(Zr/Nb/Ta) ratio is 3:2. Also, garnets used herein includes, but are not limited to, $Li_x La_3 Zr_2 O_{12}+y Al_2 O_3$, wherein x ranges from 5.5 to 9; and y ranges from 0 to 1. In these examples, x and y are selected so that the garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples, x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_x La_3 Zr_2 O_{12}+y Al_2 O_3$. In one embodiment, the Li-stuffed garnet used to fabricate setter plates of the present disclosure has a composition of $Li_7 Li_3 Zr_2 O_{12}$. In another embodiment, the Li-stuffed garnet used to fabricate setter plates of the present disclosure has a composition of $Li_7 Li_3 Zr_2 O_{12} \cdot Al_2 O_3$. In yet another embodiment, the Li-stuffed garnet used to fabricate setter plates of the present disclosure has a composition of $Li_7 Li_3 Zr_2 O_{12} \cdot 0.22 Al_2 O_3$. In yet another embodiment, the Li-stuffed garnet used to fabricate setter plates of the present disclosure has a composition of $Li_7 Li_3 Zr_2 O_{12} \cdot 0.35 Al_2 O_3$. In certain other embodiments, the Li-stuffed garnet used to fabricate setter plates of the present disclosure has a composition of $Li_7 Li_3 Zr_2 O_{12} \cdot 0.5 Al_2 O_3$. In another embodiment, the Li-stuffed garnet used to fabricate setter plates of the present disclosure has a composition of $Li_7 Li_3 Zr_2 O_{12} \cdot 0.75 Al_2 O_3$.

As used herein, garnet does not include YAG-garnets (i.e., yttrium aluminum garnets, or, e.g., $Y_3 Al_5 O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3 Y_2 (SiO_4)_3$ wherein X is Ca, Mg, Fe, and, or, Mn; and Y is Al, Fe, and, or, Cr.

As used herein, the phrases "garnet precursor chemicals," "chemical precursor to a garnet-type electrolyte," "precursors to garnet" and "garnet precursor materials" refer to chemicals which react to form a lithium stuffed garnet material described herein. These chemical precursors include, but are not limited to lithium hydroxide (e.g., LiOH), lithium oxide (e.g., $Li_2O$), lithium carbonate (e.g., $LiCO_3$), zirconium oxide (e.g., $ZrO_2$), lanthanum oxide (e.g., $La_2O_3$), lanthanum hydroxide (e.g., $La(OH)_3$), aluminum oxide (e.g., $Al_2O_3$), aluminum hydroxide (e.g., $Al(OH)_3$), aluminum (e.g., Al), aluminum nitrate (e.g., $Al(NO_3)_3$), aluminum nitrate nonahydrate, niobium oxide (e.g., $Nb_2O_5$), and tantalum oxide (e.g., $Ta_2O_5$). Other precursors to garnet materials, known in the relevant field to which the instant disclosure relates, may be suitable for use with the methods set forth herein.

As used herein the phrase "garnet-type electrolyte," refers to an electrolyte that includes a lithium stuffed garnet material described herein as the $Li^+$ ion conductor. The advantages of Li-stuffed garnet solid-state electrolytes are many, including as a substitution for liquid, flammable electrolytes commonly used in lithium rechargeable batteries.

As used herein, the phrase "$d_{50}$ diameter" refers to the median size, in a distribution of sizes, measured by microscopy techniques or other particle size analysis techniques, such as, but not limited to, scanning electron microscopy or dynamic light scattering. $D_{50}$ describes a characteristic dimension of particles at which 50% of the particles are smaller than the recited size.

As used herein, the phrase "grain size" refers the characteristic dimension, or maximum dimension (e.g., diameter of a spherically-shaped grain), defining a region that has a homogeneous composition, crystalline structure, and crystal orientation. Grains can be observed by high resolution TEM or electron back-scatter diffraction (EBSD).

The term "unpolished" in the context of a setter plate refers to a setter plate that has been thermally cycled (e.g., heated or seasoned) but not subsequently polished.

The term "polished" in the context of a setter plate refers to a setter plate that has been thermally cycled (e.g., heated or seasoned) and subsequently polished.

As used herein, "thermally cycling" in the context of a setter plate refers to heating a setter plate without sintering a green film thereupon.

As used herein, the phrase "green film" refers to an unsintered film including at least one member selected from garnet materials, precursors to garnet materials, binder, solvent, carbon, dispersant, or combinations thereof.

As used herein, "flatness" of a surface refers to the greatest normal distance between the lowest point on a surface and a plane containing the three highest points on the surface, or alternately, the greatest normal distance between the highest point on a surface and a plane containing the three lowest points on the surface. It may be measured with an AFM, a high precision optical microscope, or laser interferometry height mapping of a surface.

As used herein, "porosity" of a body is the fractional volume that is not occupied by material. It may be measured by mercury porosimetry or by cross-sectioning the body and optically determining the 2D fractional area of porosity of the cross-sectioned surface.

The preparation of the Li-stuffed garnet solid state electrolytes, at a high level, involves preparing a mixture of precursor materials, calcined garnet materials, or combinations thereof and binders. In some examples, the preparation further includes pressing, providing or forming the mixture into a desired form factor (such as a plate, disk, film, or pellet) or cast (e.g., tape cast, slot-die, screen print, slip-cast, gel-cast, or doctor-bladed) as a film. In some examples, the preparation further includes sintering the mixture or film under the pressure applied to the sintering electrolyte on account of the weight of the setter placed in contact with the sintering mixture or film. Certain preparation methods for solid state electrolytes are also described in U.S. Patent Application Publication No. U.S. 2015/0099190, which published Apr. 9, 2015 and was filed Oct. 7, 2014, which is incorporated by reference herein in its entirety.

Overview

Ion (e.g., Li+) mobility is typically lower in solid state electrolytes compared to ion mobility in conventionally used, flammable, liquid electrolytes. To compensate for this lower ion mobility, the solid electrolyte dimensions, such as the thickness of a film, are reduced (from approximately 200 microns or 100 microns to approximately 50 microns or 10 microns) so that a significantly reduced ion migration distance through the solid state electrolyte (compared to the conventional liquid electrolyte) compensates for the lower mobility. The result is a solid state electrolyte that provides energy delivery rates (i.e., power) comparable to, or superior to, energy delivery rates of secondary batteries using flammable, liquid electrolytes.

However, challenges remain in the fabrication of a solid state electrolyte thinner than approximately 100 microns and with sufficient mechanical integrity to operate reliably within a solid-state battery. For example, cracks, voids, and other inhomogeneities can act as nucleation sites for lithium ions. As the lithium ions nucleate at these sites, metallic lithium can continue to accrete at these sites during discharge of the battery and can lead to shorting of the battery once lithium dendrites electrically connect the anode to the cathode or vice versa. In other situations, inhomogeneities, cracks, and/or surface roughness can increase resistance at interfaces between the solid state electrolyte and the corresponding positive and negative electrodes. This has the effect of reducing battery efficiency and power. Furthermore, as mentioned above, maintaining stoichiometry of a solid state electrolyte is an important factor in proper functioning of the battery in terms power and energy delivery efficiency.

Embodiments of the present disclosure use Li-stuffed garnet setter plates or setter plates which include a Li-stuffed garnet oxide to apply pressure to similarly, substantially similarly, or identically composed Li-stuffed solid electrolytes films, wherein the pressure applied is related to the weight of the setter plate. Additional external pressures are typically not applied to the setter plate; rather the setter plate is designed so that the weight of the plate is sufficient to press onto a sintering film and form a smooth surface but not to crack the sintering film as it is sintering or after it is sintered. As is shown in FIG. 1, Li-stuffed garnet setter plates 100 are used to apply pressure to a dried slurry (referred to herein and in U.S. Patent Application Publication No. 2015-0200420 as a "green film") of precursor materials and binders 104 during sintering. In some examples, the dried slurry is referred to as a green tape. In some examples, a green film is a dried slurry of unsintered materials. Solid state electrolytes have been fabricated herein using "setter plates" that apply pressure to solid electrolyte precursor materials prior to and during sintering. These plates are normally flat and do not generally react with the sintered material. Conventional inert setter plates can be metallic (e.g., platinum) or ceramic (e.g., zirconia ($ZrO_2$) or alumina ($Al_2O_3$)) and, optionally, can be porous to provide for the diffusion of gases and vapors therethrough during sintering. However, several problems are associated with conventional setter plates, such as adherence of the conventional setter plates to the sintering thin film or destruction of the Li-stuffed garnet chemical composition in the sintering thin film.

In some examples described herein, other setter plates may be used, for example in combination with the lithium stuffed garnet setter plates described herein, so long as that other setter plate has a high melting point, a high lithium activity, and stability in a reducing environment. Some examples of these other materials include a member selected from $Li_2ZrO_3$, $xLi_2O\text{-}(1-x)SiO_2$ (where x=0.01-0.99), $aLi_2O\text{-}bB_2O_3\text{-}cSiO_2$ (where a+b+c=1), $LiLaO_2$, $LiAlO_2$, $Li_2O$, $Li_3PO_4$, a Li-stuffed garnet, or combinations thereof. In some embodiments, the other setter plates comprise $Li_2ZrO_3$. In some embodiments, the other setter plates comprise $Li_2SiO_3$. In some embodiments, the other setter plates comprise $LiLaO_2$. In some embodiments, the other setter plates comprise $LiAlO_2$. In some embodiments, the other setter plates comprise $Li_2O$. In some embodiments, the other setter plates comprise $Li_3PO_4$. In some embodiments, the other setter plates comprise a Li-stuffed garnet. In some embodiments, the other setter plates comprise at least two, three, four or more of $Li_2ZrO_3$, $Li_2SiO_3$, $LiLaO_2$, $LiAlO_2$, $Li_2O$, $Li_3PO_4$, and a Li-stuffed garnet. Additionally, these other setter plates should not induce a chemical potential in the sintering film which results in Li diffusion out of the sintering film, for example, into the setter plate.

While some setter plates could be fabricated from other unrelated garnet-type materials (i.e., having a composition according to $X_3Y_2(SiO_4)_3$ where X is a divalent cation (e.g., $Ca^{2+}$, $Mg^{2+}$, $Fe^{2+}$, $Mn^{2+}$) and Y is a trivalent cation (e.g., $Al^{3+}$, $Fe^{3+}$, $Cr^{3+}$)), these other unrelated garnet-type setter plate compositions, even though structurally garnet, are not suitable for fabrication of lithium-stuffed garnet solid electrolytes for lithium secondary batteries. Conventional and/or commercially available setter plates, when in contact with a sintering Li electrolyte, result in a chemical potential that drives Li loss (e.g., Li diffusion out of the electrolyte) during the sintering process and destruction of the chemical composition of the Li electrolyte (e.g., destruction of, or change in, the Li-stuffed garnet composition). Even assuming that some of these other setter plates were able to be used to sinter Li-stuffed garnet solid electrolytes having surfaces sufficiently smooth and with sufficient mechanical integrity (i.e., few or no cracks, pores, or inhomogeneities that act as sites for mechanical failure of metallic lithium nucleation), deficiencies remain. For example, conventional setter plates, whether $ZrO_2$, $Al_2O_3$, or platinum alloy with lithium, permit the diffusion of lithium from the precursor materials into the setter plates. Thus, at sintering temperatures, the Li-stuffed solid electrolyte changes composition as lithium diffuses into the setter plates. This, in turn, reduces the performance of the solid electrolyte that is produced by this sintering process.

In contrast, embodiments of the present disclosure fabricate setter plates out of garnet materials having the same or substantially similar composition as the Li-stuffed garnet solid electrolyte. In addition to providing a surface by which to apply pressure to the solid state electrode precursor mixture, setter plates of the present disclosure do not affect the composition of the Li-stuffed garnet solid electrolyte itself. This has the benefit of maintaining compositional control of the solid electrolyte itself during sintering when, upon heating, lithium is prone to diffusing out of the solid electrolyte. Furthermore, surprisingly, the Li-stuffed solid electrolyte produced by using setter plates of a same, or substantially similar, composition has superior mechanical integrity (e.g., lower areal crack density, less variation in surface roughness) compared to Li-stuffed solid electrolyte sintered between conventional setter plates having different composition from the solid electrolyte.

Setters

In some examples, the instant disclosure provides a setter plate suitable for use for fabricating solid electrolytes of a rechargeable battery, wherein the setter plate includes a Li-stuffed garnet compound characterized by the formula $Li_xLa_yZr_zO_t \cdot qAl_2O_3$, wherein $4<x<10$, $1<y<4$, $1<z<3$, $6<t<14$, and $0 \leq q \leq 1$. In some examples, the setter plate has a surface defined by a first lateral dimension from 2 cm to 30 cm and a second lateral dimension from 2 cm to 30 cm; and a thickness from 0.1 mm to 100 mm.

In some examples, the surface is defined by a first lateral dimension from 5 cm to 20 cm and a second lateral dimension from 5 cm to 20 cm.

In some examples, the thickness is from 1 mm to 100 mm. In other examples, the thickness is from 0.1 mm to 10 mm. In still other examples, the thickness is from 0.5 mm to 5 mm. In some other examples, the thickness is from 1 mm to 1.5 mm.

In some examples, the Li-stuffed garnet compound comprises grains from 1 microns in diameter to 400 microns in diameter. In some examples, the Li-stuffed garnet compound comprises grains having a grain size from 2 microns to 10 microns. In other examples, the Li-stuffed garnet compound comprises grains having a grain size from 100 microns to 400 microns.

In some examples of the setter plates set forth herein, the surface of the setter plate has a surface roughness from 1.0 μm Ra to 4 μm Ra, wherein Ra is an arithmetic average of absolute values of sampled surface roughness amplitudes. In some examples, the surface has a surface roughness from 0.5 μm Rt to 30 μm Rt, wherein Rt is the maximum peak height of sampled surface roughness amplitudes. In some examples, the surface roughness is from 1.6 Ra to 2.2 μm Ra. In other examples, the surface roughness is from 3.2 μm Ra to 3.7 μm Ra. In still other examples, the surface roughness is from 1 μm Rt to 28 μm Rt. In some other examples, the surface roughness is from 10 μm Rt to 30 μm Rt. In certain examples, the surface roughness is from 15 μm Rt to 30 μm Rt. In some examples, the crystallite size in the grains is about 200 nm to 1 μm. In some examples, the crystallite size in the grains is about 100 nm to 5 μm.

In some examples, q is 0.35 or 1. In some examples, the formula characterizing the setter plate is $Li_7La_3Zr_2O_{12} \cdot qAl_2O_3$, wherein q is 0, 0.3, 0.35, 0.5, 0.75, or 1.0.

In some examples, set forth herein is a setter plate suitable for use for fabricating solid electrolytes of a rechargeable battery, wherein the setter plate includes an oxide material with lithium concentration greater than 0.02 mol/cm³ and a melting point above 1100° C. In some examples, the surface of the setter plate is defined by a first lateral dimension from 3 cm to 30 cm and a second lateral dimension from 3 cm to 30 cm; and a thickness from 0.1 mm to 100 mm.

In some examples, the setter plate includes an oxide material selected from $LiLaO_2$.

In some examples, the setter plate includes an oxide material selected from $Al_2O_3$.

In some examples, the setter plate includes an oxide material selected from $ZrO_2$.

In some examples, the setter plate includes an oxide material selected from $La_2O_3$.

In some examples, the setter plate includes an oxide material selected from $LiAlO_2$.

In some examples, the setter plate includes an oxide material selected from $Li_2O$.

In some examples, the setter plate includes an oxide material selected from $Li_3PO_4$.

In some examples, the setter plate includes an oxide material selected from $LiLaO_2$, $LiAlO_2$, $Li_2O$, $Li_3PO_4$, or a Li-stuffed garnet compound characterized by the formula $Li_xLa_y$—$Zr_zO_t \cdot qAl_2O_3$, wherein $4<x<10$, $1<y<4$, $1<z<3$, $6<t<14$, $0 \leq q \leq 1$, or combinations thereof.

Method of Making Setters

FIG. 1B illustrates a plan view and a cross-sectional view of a Li-stuffed garnet setter plate of the present disclosure taken through line A-A' in FIG. 1A. The plan view 120 illustrates that a Li-stuffed garnet setter plate of the present disclosure is up to 10 cm per side in one embodiment, although it will be appreciated that other embodiments can have lateral dimensions greater or smaller than 10 cm. In some embodiments, a lateral dimension is as low as 5 cm and as high as 20 cm. In some other embodiments, a lateral dimension is as low as 1 cm and as high as 96 cm. Also, generally the setter plates of the present disclosure are square or rectangular, but other embodiments include setter plates that are any regular or irregular polygon, or even have circular or ellipsoidal cross-sections. The cross-sectional view 130 illustrates a Li-stuffed garnet setter plate of the present disclosure up to 2 mm thick, in an embodiment. Other embodiments are between approximately 1 mm and 1.5 mm thick. Still other embodiments are as thick as 100 mm. This thickness is a benefit of Li-stuffed garnet setter plates of the present disclosure, which maintain mechanical integrity even in these relatively thin configurations. However, the setter plates cannot be too thick (e.g., areal density greater than 1.7 g/cm$^2$) or the weight of the setter plate may crack or stick to the sintered film that is positioned between the setter plates. It is therefore advantageous to size the setter plates, in some examples, such that the weight of the setter and its size result in an areal density of 1.7 g/cm$^2$ or less.

Figure 2:
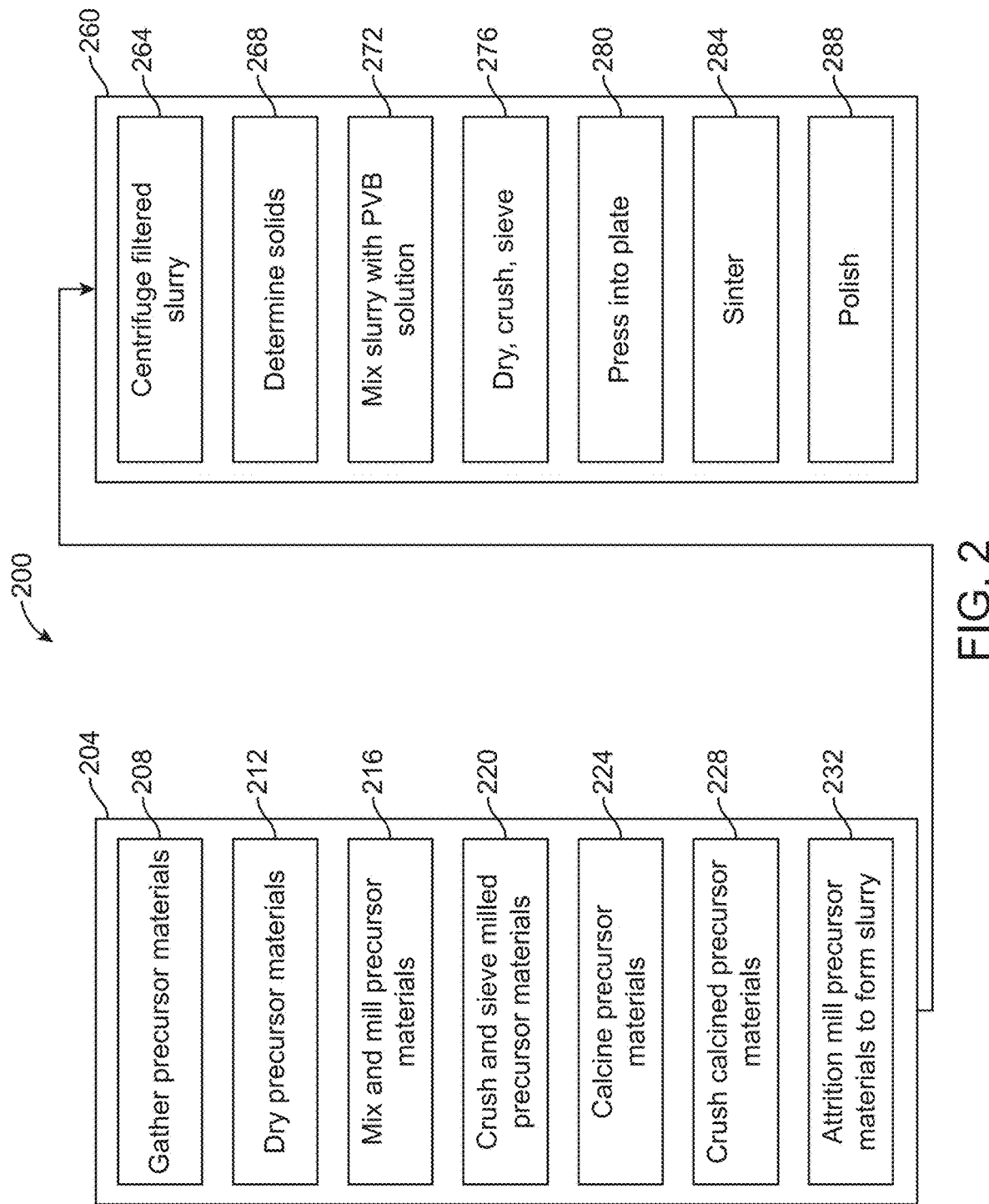
FIG. 2 illustrates a method of fabrication of Li-stuffed garnet setter plates, in an embodiment.

FIG. 2 illustrates one embodiment of a method 200 for fabricating Li-stuffed garnet setter plates. As shown in FIG. 2, the method 200 can, for convenience of explanation only, be depicted in two meta-steps: raw material preparation 204; and setter plate fabrication 260. The method 200 is described below in more detail.

Within raw material preparation 204 meta-step, precursor materials LiOH, Al(NO$_3$)$_3$.9H$_2$O, ZrO$_2$, and La$_2$O$_3$ are gathered 208 in quantities corresponding to molar amounts of the final Li-stuffed garnet setter plate final composition (Li$_A$L-a$_B$M'$_C$M"$_D$Zr$_E$O$_F$, Li$_A$La$_B$M'$_C$M"$_D$Ta$_E$O$_F$, or Li$_A$L-a$_B$M'$_C$M"$_D$Nb$_E$O$_F$, wherein 4<A<8.5, 1.5<B<4, 0≤C≤2, 0≤D≤2; 0≤E<2, 10<F<13, e.g., Li$_7$La$_3$Zr$_2$O$_{12}$), as described above and as also described in various experimental examples of U.S. Patent Application Publication No. U.S. 2015/0099190, which published Apr. 9, 2015. In one embodiment, precursor materials are combined in proportions that, when reacted, produce a composition of Li$_7$Li$_3$Zr$_2$O$_{12}$ or Li$_7$Li$_3$Zr$_2$O$_{12}$(0.35-1.0)Al$_2$O$_3$. The precursor materials are dried 212 at 120° C. for at least 45 minutes. The dried precursor materials mixed and are optionally in some embodiments milled 216 in a ball mill between 6 and 8 hours using, in some examples, 0.3 mm yttria-stabilized zirconium oxide grinding media beads. The result is a particle size distribution of precursor materials with a d$_{50}$ of approximately 100 nm. In some examples, the result is a particle size distribution of precursor materials with a d$_{50}$ of approximately 100 nm to 600 nm. The precursor materials are optionally crushed using a Retzsch mill and sieved 220 using a 40 mesh sieve for 5 minutes. The precursor materials are then placed in an alumina crucible, covered, and calcined 224 at about 900° C. (or at a temperature ranging from 400° C. to 1200° C.) for approximately 6 hours (or for about 2, 4, 6, or 8 hours). The calcined product is then crushed 228 with, for example, a mortar and pestle although other grinding and milling mechanisms may be used. The calcined and crushed precursor materials are then attrition milled 232 by suspending approximately 62.5 weight % solids and 10 weight % dispersant, with a suspension media such as isopropyl alcohol making up the balance of the weight (i.e., approximately 27.5 weight %). In some examples, step 232 includes about 60 g of garnet, about 30 g of solvent, and about 10 g of dispersant. In some examples, the solvent is isopropanol and butanol.

Examples of dispersants, used to facilitate suspension of the calcined and crushed precursor materials in the isopropyl alcohol include, but are not limited to, phosphate esters, RHODOLINE™ 4160, RHODOLINE™ 4188, Phoschem R6, Phoschem PD, phospholan-131™, esters such as fish oil, BYK™ 22124, surfactants, fluorosurfactants, polyvinylpyridine (PVP), polyvinyl butadiene (PVB), TRITON™, phospholan-131™, BYK™ 22124, BYK™ 22416, Hypermer KD1™, polyalkylene amine such as Hypermer KD2, acrylic polymers such as Hypermer KD6™, Hypermer KD7™ and others, such as Dispersbyk-118, BYK™ 22146, Hypermer KD™. While isopropyl alcohol is used in this example, other solvents may also be used including toluene, ethanol, combinations thereof (i.e., toluene:ethanol::4:1) and others. The attrition milling may be performed for approximately eight hours with an inert zirconia grinding media to produce a d$_{50}$ particle size distribution from approximately 100 nm to approximately 1 μm (e.g., from approximately 300 nm to approximately 400 nm).

Meta-step 260 begins with the slurry produced by meta-step 232 as an input. The slurry is optionally centrifuged 264 at 2000 rpm for 1-12 hours. Step 264 is optional and may or may not be used. If, however, the slurry is centrifuged 264, the supernatant is drained and the percentage of solids in the remaining slurry is determined 268. If the slurry is not centrifuged, the solid loading is determined and adjusted appropriately. In some examples the percentage of solids in the slurry is between approximately 40 weight %, 50 weight % 60 weight % or 70 weight % or any weight % that falls between any two of these values. In some examples, the slurry is adjusted or prepared so that the slurry includes, in relative amounts respectively, approximately 60 g of garnet, approximately 100 g of solvent, approximately 4 g of binder (PVB) and approximately 1 g of plasticizer (e.g., dibutyl phthalate, benzyl dutyl phthalate, and the like).

The slurry is then mixed 272 with a 4 weight % solution of polyvinyl butyral binder in toluene in a weight ratio of 1:1. This mixture is then dried, mechanically crushed (for example, using a mortar and pestle), and sieved 276, for example, using an 80 mesh sieve. Resulting from 276 is a slurry having approximately 100 g of garnet, 4 g of binder, and 1 g of plasticizer.

The combined Li-stuffed garnet powder, solvent, binder, and plasticizer are then mixed and milled using techniques described above. As noted in FIG. 2, the approximate composition of combination is in some examples: about 50 wt % powder, 47.5 wt % solvent, 2 wt % binder and 0.5 wt % plasticizer. Binders and solvents are described herein, above and below. The combined components are then mixed and/or optionally milled for approximately 8 hours (e.g., by hand stirring although the components can be combined using appropriate mixer or blender). The mixed components are placed on a hot plate or oven to remove the solvents as per step 276 in FIG. 2. Other methods to remove solvents such as ROTO-VAP™ or spray drying could also be used.

The powder produced after drying, crushing, and sieving 276 is pressed 280 into a setter plate format using a mechanical press and corresponding die. For example, forming a setter plate into a format of a square approximately 2.5 cm on a side includes applying 2000 lbs of force to the powder. In other examples, the method includes forming a setter plate into a format of a square approximately 10 cm on a side includes applying 2000 lbs of force to the powder.

The pressed plate is then placed between, or on top of, commercially available (e.g., platinum) setter plates (or alternatively on a single substrate) and sintered 284 in a furnace at from approximately 500° C. to approximately 1300° C. (and preferably from 1075° C. to approximately 1150° C.) in an argon atmosphere, for approximately three hours to approximately six hours. In some examples, the setter plate is removed from the furnace and placed at room temperature to air quench. In some other examples, the setter plate is left in the oven to cool over many hours (e.g., for at least 2, 3, 4, 6, 12, 15, 18, 24, 30 or 36 hours). The ramp rate of the furnace is from about 1° C./min to about 10° C./min. Once removed from the furnace, the Li-stuffed garnet setter plate is polished 288 sequentially with 30 micron, 15 micron, 9 micron, and 5 micron alumina polishing powders. In some examples, the setter is polished using 30 microns alumina polishing powder.

In some examples, the setter plates are then subsequently thermally cycled (i.e., seasoned) to reduce the tendency of the setter plate to stick to a given sintered film. As used herein, thermally cycling includes heating the setter plates without sintering a green film thereupon. This thermal cycling is associated with a grain growth in the setter plate. In between thermal cycling, the setter plate is either polished or is not polished. If the setter plate is polished following a thermal cycling, the setter plate is referred herein as a polished setter plate. If the setter plate is not polished following a thermal cycling, the setter plate is referred herein as an unpolished setter plate.

In some examples, set forth herein is a method of making a Li-stuffed garnet setter plate which includes mixing precursor materials, to form a mixture, in proportions sufficient to produce, upon reaction, a Li-stuffed garnet compound having a composition of $Li_xLa_y$—$Zr_zO_t \cdot qAl_2O_3$, wherein $4<x<10$, $1<y<4$, $1<z<3$, $6<t<14$, $0 \leq q \leq 1$; optionally calcining the mixture to form garnet powder; milling the mixture or the garnet powder; forming a pellet of the Li-stuffed garnet setter plate; placing the pellet onto a substrate; sintering the pellet at a temperature of from 450° C. to 1300° C.; and optionally cooling the pellet in air at 1 atmosphere of pressure and 25° C.

In some examples, the methods herein include forming a pellet comprises pressing the mixture or the garnet powder into a pellet of the Li-stuffed garnet setter plate.

In some examples, the methods herein include polishing the garnet setter plate.

In some examples, the methods herein include milling the mixed precursor materials including incorporating a binder or polymer selected from nitriles, nitrile butadiene rubber, carboxymethyl cellulose (CMC), styrene butadiene rubber (SBR), PVDF-HFP, PAN, aqueous-compatible polymers, atactic polypropylene (aPP), silicone, polyisobutylene (PIB), ethylene propylene rubber (EPR), PMX-200 PDMS (polydimethylsiloxane/polysiloxane, i.e., PDMS or silicone), polyacrylonitrile (PAN), polymethylmethacrylate (PMMA), poly vinylchloride (PVC), poly vinylbutyral (PVB), or poly(vinylidene) fluoride-hexafluoropropylene PVDF-HFP.

In some examples, the binder is PVB or Duramax B-1000 or Duramax B-1022 or polyethylineimine.

In some examples, the methods herein include using the pellet in a seasoning sintering cycle.

In some examples, the substrate is a metal. In some examples, the substrate is metallic platinum or nickel.

In some of the methods herein, the proportions of the precursor materials are mixed to produce, upon reaction, a Li-stuffed garnet compound have the composition of $Li_xLi_3Zr_2O_{12} \cdot qAl_2O_3$, wherein q is 0, 0.35, 0.5, 0.75, or 1 and x is between 5.0-7.7.

Method of Making Sintered Electrolyte Films

In some examples, an unsintered thin film is prepared or cast so that it can be placed between setter plates in a subsequent sintering procedure. This process includes a slurry preparation step in which a combination of milled Li-stuffed garnet powder that is a product of the meta-step 204 is combined with one or more solvents, a binder, and a plasticizer (such as dibutyl phthalate).

In some examples, the slurry includes a solvent selected from isopropanol, water, butanol, tetrahydrofuran (THF), with a binder (e.g., PVB), and/or a plasticizer. In some examples, the solvent includes about 10-30% w/w isopropanol, 1-10 w/w water, 1-10% w/w butanol, and 10-30% w/w tetrahydrofuran (THF) [e.g. 100 grams garnet, 12 grams binder, 12 grams DBP, 20-30 grams solvent]. In some examples, the solvent includes about 20-30% w/w isopropanol, 3-6% w/w water, 3-6% w/w butanol, and 20-30% w/w tetrahydrofuran (THF). In some examples, the binder is 5% w/w. In some examples, the plasticizer is 5 w/w. In these examples, the garnet or calcined precursor materials represent the remaining % w/w (e.g., 40, 50, or 60% w/w). In some examples, a dispersant is used during the milling process. In some examples, the dispersant is a phosphate ester. In some examples, the plasticizer is dibutyl phthalate or benzyl butyl phthalate. In some examples, the solvent is butanol and THF. In some examples, the solvent is butanol, water and THF. In some examples, the solvent is butanol, water, toluene, and THF. In some examples, the solvent is butanol and toluene. In some examples, the solvent is butanol, water and THF.

Examples of solvents include toluene, ethanol, diacetone alcohol, and combinations thereof. Other examples of solvents include combinations of isopropanol, butanol, and toluene. Other examples of solvents include methanol, ethanol, isopropanol, butanol, pentanol, hexanol, toluene, xylene, tetrahydrofuran, toluene: ethanol, acetone, N-methyl-2-pyrrolidone (NMP) diacetone alcohol, ethyl acetate, acetonitrile, hexane, nonane, dodecane, methyl ethyl ketone (MEK), and combinations thereof.

Examples of binders, used to facilitate the adhesion between the Li-stuffed garnet particles, include, but are not limited to, polypropylene (PP), polyvinyl butyral (PVB), poly ethyl methacrylate (PMMA), polyvinyl pyrrolidone (PVP), atactic polypropylene (aPP), isotactive polypropylene ethylene propylene rubber (EPR), ethylene pentene copolymer (EPC), polyisobutylene (PIB), styrene butadiene rubber (SBR), polyolefins, polyethylene-copoly-1-octene (PE-co-PO); PE-co-poly(methylene cyclopentane) (PE-co-PMCP); stereo block polypropylenes, polypropylene polymethylpentene copolymer, poly propylene carbonate, methyl methacrylate, ethyl methacrylate, and silicone. Other binders include binder is selected polypropylene (PP), atactic polypropylene (aPP), isotactic polypropylene (iPP), ethylene propylene rubber (EPR), ethylene pentene copolymer (EPC), polyisobutylene (PIB), styrene butadiene (SBR), polyolefins, polyethylene-co-poly-1-octene (PE-co-PO), PE-co-poly(methylene cyclopentene) (PE-co-PMCP), stereoblock polypropylenes, polypropylene polymethyl pentene, polyethylene oxide (PEO), PEO block copolymers, silicone, and combinations thereof.

In order to make unsintered tape-cast films (i.e., green films), which can be placed between setter plates for sintering, the following steps may be employed. The garnet precursors are combined with solvent and binder in amounts such that after sintering, the ratio of chemical reactants matches the ratio of the constituent components in the final garnet electrolyte film assuming no mass loss. These precursors are mixed and milled. After about 8 hours, a plasticizer is added in an amount of approximately 5 weight % of the combined components. Solvent is added in an amount of approximately 5-50 weight % of the combined components. Mixing and milling may optionally continue after the addition of the plasticizer and solvent for another 12 hours. After the completion of the mixing and milling, the resulting slurry is filtered to remove any remaining grinding media and agglomerates or to ensure the homogeneity of the particle sizes therein. The slurry can then be cast, e.g., by doctor blading, to prepare a thin film of unsintered green film.

In some embodiments, the unsintered green film is then placed on top of a Li-stuffed garnet setter plate to fabricate a Li-stuffed garnet solid electrolyte. In such embodiments, the unsintered green film is sintered on top of the Li-stuffed garnet setter plate to form a sintered garnet film. A metal foil or metal powder can optionally be placed between the setter plate and the unsintered green film prior to sintering. The metal foil or metal powder can be selected from the group consisting of: Ni, Cu, Fe, Al, Ag, alloys thereof, or combinations thereof. Additional embodiments are described in further detail below.

In some examples, a setter plate is placed on top of the unsintered green film which is itself on top of a Li-stuffed garnet setter plate and subsequently sintered to fabricate a Li-stuffed garnet solid electrolyte.

In some examples, set forth herein is a method of using a Li-stuffed garnet setter plate to fabricate a Li-stuffed garnet solid electrolyte for a rechargeable battery, wherein the method includes: placing a green film of unsintered Li-stuffed garnet precursor materials between two Li-stuffed garnet setter plates; and sintering the green film between the two Li-stuffed garnet setter plates.

In some examples, set forth herein is a method of using a Li-stuffed garnet setter plate to fabricate a Li-stuffed garnet solid electrolyte for a rechargeable battery, wherein the method includes placing a green film of unsintered Li-stuffed garnet precursor materials on top of a Li-stuffed garnet setter plate; and sintering the green film on top of the Li-stuffed garnet setter plate to form a sintered garnet film.

In some examples, the methods herein further include placing a metal foil or metal powder between at least one setter plate and the green film prior to the sintering the green film. In some examples, the methods herein further include placing a metal foil or metal powder between the setter plate and the green film prior to the sintering the green film.

In some examples, the metal is Ni, Cu, Fe, Al, Ag, combinations thereof, or alloys thereof.

In some examples, the green film has a surface defined by a first lateral dimension from 1 cm to 50 cm and a second lateral dimension from 1 cm to 50 cm. In other examples, the green film has a surface defined by a first lateral dimension from 1 cm to 30 cm and a second lateral dimension from 1 cm to 30 cm.

In some examples, the green film has a thickness between 1 μm to about 100 μm. In other examples, the green film has a thickness between 20 μm to about 100 μm.

In some examples, the sintering includes heating the green electrolyte film and the two Li-stuffed garnet setter plates to between 450° C. and 1300° C.

In some examples, the sintering comprises heating the green electrolyte film and a Li-stuffed garnet setter plate to between 450° C. and 1300° C.

In some examples, the sintering comprises exposing, during the heating, the green film and the two Li-stuffed garnet setter plates to an Argon:$H_2$ mixed atmosphere.

In some examples, the sintering comprises exposing, during the heating, the green film and the two Li-stuffed garnet setter plates to an Argon atmosphere.

In some examples, the green film is an unsintered green film. In certain examples, the green film is a tape-cast green film.

In some examples, the sintering comprises exposing, during the heating, the tape-cast green film and the two Li-stuffed garnet setter plates to an Argon:$H_2$:$H_2O$ mixed atmosphere.

In some examples, the sintering comprises exposing, during the heating, the green film and the two Li-stuffed garnet setter plates to an oxygen-containing atmosphere.

In some examples, the sintering comprises exposing, during the heating, the green film and the two Li-stuffed garnet setter plates to 95:5::Argon:$H_2$ atmosphere.

In some examples, the sintering produces a sintered Li-stuffed garnet solid electrolyte less than 100 microns thick and more than 1 nm thick. In some examples, the sintering produces a sintered Li-stuffed garnet solid electrolyte less than 80 microns thick. In some examples, the sintering produces a sintered Li-stuffed garnet solid electrolyte less than 70 microns thick. In certain examples, the sintering produces a sintered Li-stuffed garnet solid electrolyte less than 60 microns thick. In certain examples, the sintering produces a sintered Li-stuffed garnet solid electrolyte less than 50 microns thick. In certain examples, the sintering produces a sintered Li-stuffed garnet solid electrolyte less than 40 microns thick. In certain examples, the sintering produces a sintered Li-stuffed garnet solid electrolyte less than 30 microns thick. In certain examples, the sintering produces a sintered Li-stuffed garnet solid electrolyte less than 20 microns thick.

In some examples, the sintered Li-stuffed garnet solid electrolyte prepared by the methods herein has an ASR from between 0.5 $\Omega \cdot cm^2$ to 10 $\Omega \cdot cm^2$ at 50° C. In other examples, the sintered Li-stuffed garnet solid electrolyte has an ASR from less than 10 $\Omega \cdot cm^2$ at 50° C. In yet other examples, the sintered Li-stuffed garnet solid electrolyte has an ASR from less than 10 $\Omega \cdot cm^2$ at 0° C. In other examples, the sintered Li-stuffed garnet solid electrolyte has an ASR from less than 20 $\Omega \cdot cm^2$ at −30° C. In still other examples, the sintered Li-stuffed garnet solid electrolyte has an ASR from less than 20 $\Omega \cdot cm^2$ at −30° C. but more than 1 $\Omega \cdot cm^2$. In some examples, the sintered Li-stuffed garnet solid electrolyte has a thickness of 80 μm and has an ASR from less than $\Omega \cdot cm^2$ at 50° C. In still other examples, the sintered Li-stuffed garnet solid electrolyte has a thickness of 80 μm and has an ASR from less than $\Omega \cdot cm^2$ at 20° C.

In some examples, the sintered Li-stuffed garnet solid electrolyte has a surface roughness of from 1.0 μm Ra to 4 μm Ra, wherein Ra is an arithmetic average of absolute values of sampled surface roughness amplitudes. In some other examples, the sintered Li-stuffed garnet solid electrolyte has a surface roughness from 1.6 μm Ra to 2.2 μm Ra, wherein Ra is an arithmetic average of absolute values of sampled surface roughness amplitudes. In some other examples, the sintered Li-stuffed garnet solid electrolyte has a surface roughness 3.2 μm Ra to 3.7 μm Ra, wherein Ra is an arithmetic average of absolute values of sampled surface roughness amplitudes.

In some examples, the methods include seasoning the two Li-stuffed garnet setter plates by using each at least once in a sintering cycle prior to the step of placing a tape-cast film of unsintered Li-stuffed garnet precursor materials between two Li-stuffed garnet setter plates.

In some examples, the methods include seasoning the two Li-stuffed garnet setter plates by using each at least once in a heating and cooling (thermal) cycle prior to the step of placing a tape-cast film of unsintered Li-stuffed garnet precursor materials between two Li-stuffed garnet setter plates.

In some examples, the methods include using the two Li-stuffed garnet setter plates at least once in a seasoning sintering cycle, wherein the using is associated with a grain size increase in each of the two Li-stuffed garnet setter plates, prior to the step of placing a tape-cast film of unsintered Li-stuffed garnet precursor materials between two Li-stuffed garnet setter plates.

In some examples, the methods include using the two Li-stuffed garnet setter plates at least once in a seasoning sintering cycle for enlarging a grain size in each of the two Li-stuffed garnet setter plates.

In some examples, the methods include using the two Li-stuffed garnet setter plates at least three time in a seasoning sintering cycle for either, or both, enlarging a grain size in each of the two Li-stuffed garnet setter plates or for reducing the tendency of the Li-stuffed garnet setter plates to adhere to a film during a subsequent sintering step, wherein the seasoning is prior to the step of placing a tape-cast film of unsintered Li-stuffed garnet precursor materials between two Li-stuffed garnet setter plates.

In some examples, the methods comprising using the two Li-stuffed garnet setter plates at least five time in a seasoning sintering cycle.

In some examples, the methods include depleting the Li concentration in the garnet setter by using the two Li-stuffed garnet setter plates at least one time in a seasoning thermal cycle. In some of these methods, the garnet setters have a reduced tendency to stick or adhere to sintering thin films.

In some examples, set forth herein is a method of using a Li-stuffed garnet setter plate to fabricate a Li-stuffed garnet solid electrolyte for a rechargeable battery, wherein the method includes placing a green film of unsintered Li-stuffed garnet precursor materials between two setter plates selected from $Li_2ZrO_3$, $xLi_2O\text{-}(1\text{-}x)SiO_2$ (where x=0.01-0.99), $aLi_2O\text{-}bB_2O_3\text{-}cSiO_2$ (where a+b+c=1), $LiLaO_2$, $LiAlO_2$, $Li_2O$, $Li_3PO_4$, a Li-stuffed garnet, or combinations thereof; and sintering the green film between the two setter plates.

In some examples, set forth herein is a method of using a Li-stuffed garnet setter plate to fabricate a Li-stuffed garnet solid electrolyte for a rechargeable battery, wherein the method includes placing a green film of unsintered Li-stuffed garnet precursor materials between two setter plates selected from $Li_2ZrO_3$, $xLi_2O\text{-}(1\text{-}x)SiO_2$ (where x=0.01-0.99), $aLi_2O\text{-}bB_2O_3\text{-}cSiO_2$ (where a+b+c=1), $LiLaO_2$, $LiAlO_2$, $Li_2O$, $Li_3PO_4$, a Li-stuffed garnet, or combinations thereof; and sintering the green film between the two setter plates.

In any of the methods herein, the green film may be a tape-cast film.

In some examples, the sintering atmosphere comprises, Air, Argon, Nitrogen, an Argon:$H_2$ mixture, or an Argon:$H_2$:$H_2O$ mixture.

In some examples, the binder is an acrylic binder.

In some examples, the binder poly methyl methacrylate or ethyl-methyl methacrylate.

In some examples, set forth herein is a method of sintering a green film including a Li-stuffed garnet or the chemical precursors to a Li-stuffed garnet, wherein the methods includes providing a green film including a Li-stuffed garnet or the chemical precursors to a Li-stuffed garnet; and sintering the green film in proximity to a Li-stuffed garnet setter such that the setter prevents the loss of Li from the sintering green film.

In some examples, set forth herein is a method of sintering a green film including a Li-stuffed garnet or the chemical precursors to a Li-stuffed garnet, wherein the method includes providing a green film comprising a Li-stuffed garnet or the chemical precursors to a Li-stuffed garnet; and sintering the green film in proximity to a Li-stuffed garnet setter such that the setter maintains the amount of Li in the sintering green film.

In some examples, set forth herein is a method of sintering a green film including a Li-stuffed garnet or the chemical precursors to a Li-stuffed garnet, including providing a green film comprising a Li-stuffed garnet or the chemical precursors to a Li-stuffed garnet; and sintering the green film in proximity to a Li-stuffed garnet setter such that the setter maintains the amount of Li in the sintering green film; wherein the sintering is in an over or furnace wherein the partial pressure of Li(g) LiO(g), and/or $L_{i2}(g)$ is between 10 and $10^{-5}$ Pascals (Pa).

In some of these methods, the green film is on top of at least one Li-stuffed garnet setter.

In some examples, the methods herein include placing a metal foil or metal powder between the setter plate and the green film prior to the sintering the green film. In some examples, the metal is Ni, Cu, Fe, Al, Ag, combinations thereof, or alloys thereof.

In some examples, the green film has a surface defined by a first lateral dimension from 1 cm to 50 cm and a second lateral dimension from 1 cm to 50 cm. In some examples, the green film has a thickness between 1 μm to about 100 μm. In some examples, the green film has a thickness between 10 μm to about 50 μm.

In some of the examples herein, the sintering comprises heating the green electrolyte film and the setter plate to between 450° C. and 1300° C.

In some examples, the sintering comprises exposing, during the heating, the green film and the two Li-stuffed garnet setter plate to an Argon:$H_2$ mixed atmosphere.

In some examples, the sintering comprises exposing, during the heating, the green film and the Li-stuffed garnet setter plate to an Argon atmosphere.

In some examples, the green film is an unsintered green film. In some of these examples, the green film is a tape-cast green film.

In some examples, the sintering includes exposing, during the heating, the tape-cast green film and the two Li-stuffed garnet setter plates to an Argon:$H_2$:$H_2O$ mixed atmosphere.

In some examples, the sintering includes exposing, during the heating, the green film and the two Li-stuffed garnet setter plates to an oxygen-containing atmosphere.

In some examples, the sintering includes exposing, during the heating, the green film and the two Li-stuffed garnet setter plates to 95:5::Argon:$H_2$ atmosphere.

In some examples, the sintering produces a sintered Li-stuffed garnet solid electrolyte less than 100 microns thick and more than 1 nm thick. In some other examples, the sintering produces a sintered Li-stuffed garnet solid electrolyte less than 50 microns thick. In some examples, the sintering produces a sintered Li-stuffed garnet solid electrolyte less than 40 microns thick. In some other examples, the sintering produces a sintered Li-stuffed garnet solid electrolyte less than 30 microns thick. In some examples, the sintering produces a sintered Li-stuffed garnet solid electrolyte less than 20 microns thick. In other examples, the sintered Li-stuffed garnet solid electrolyte has an ASR from between 0.1 Ω·cm$^2$ to 10 Ω·cm$^2$ at 0° C.

In some examples, set forth herein, during the sintering, the partial pressure of Li(g), LiO(g), or $Li_2O$(g) and is $10^{-1}$ Pa. In other examples, the partial pressure of Li(g), LiO(g), or $Li_2O$(g) is $10^{-2}$ Pa. In some other examples, the partial pressure of Li(g), LiO(g), or $Li_2O$(g) is $10^{-3}$ Pa. In yet other examples, the partial pressure of Li(g), LiO(g), or $Li_2O$(g) is $10^4$ Pa. In some other examples, the partial pressure of Li(g), LiO(g), or $Li_2O$(g) is $10^{-5}$ Pa.

Polishing and Phase Assemblage

Figure 3A:
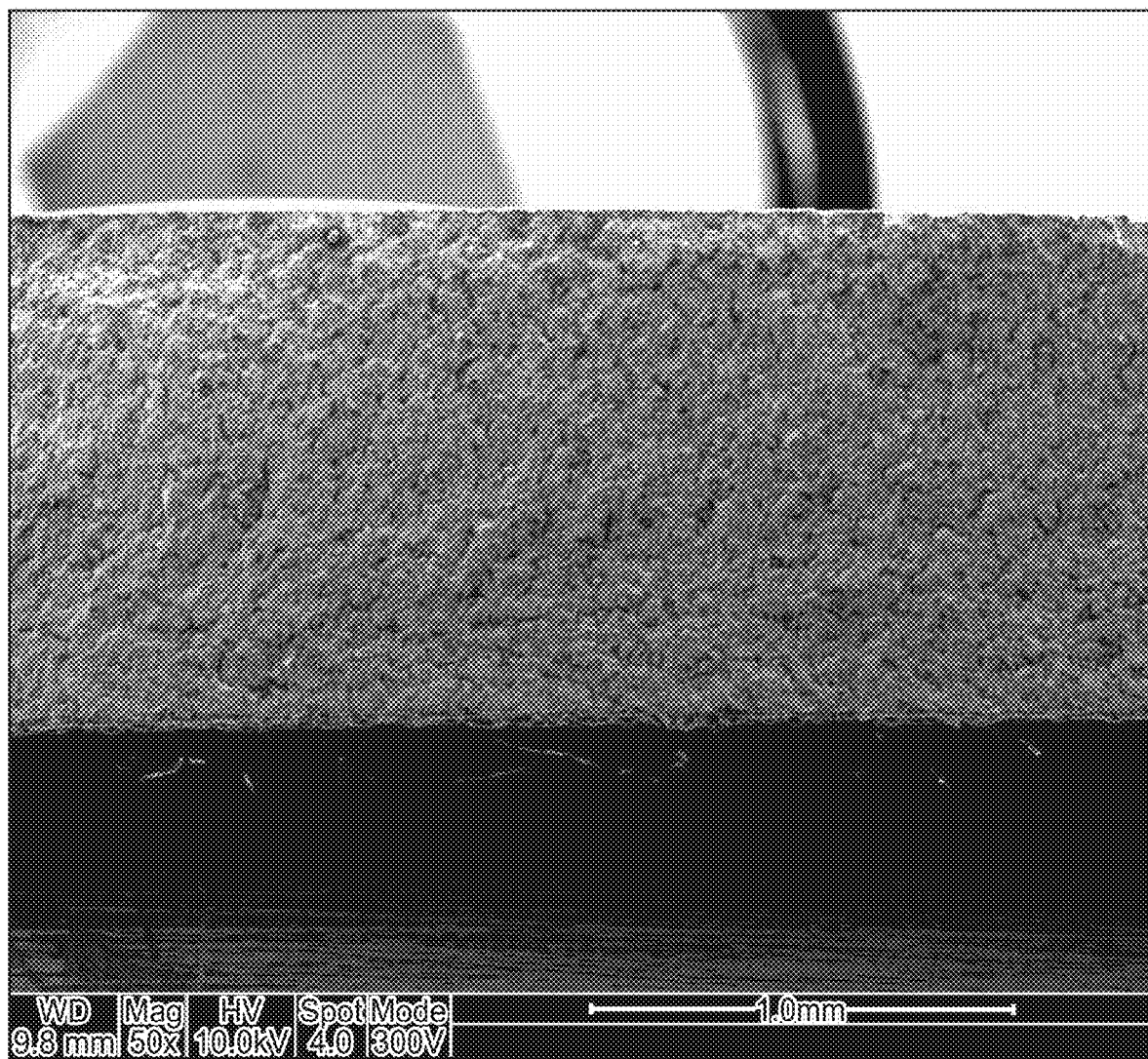
FIG. 3A is a cross-sectional scanning electron micrograph (SEM) of a Li-stuffed garnet setter plate of the present disclosure fabricated according to the method illustrated in FIG. 2, in an embodiment.

An example Li-stuffed garnet setter plate produced from method 200 is shown in FIG. 3A, which is a cross-sectional scanning electron micrograph of a Li-stuffed garnet setter plate of the present disclosure. The image of FIG. 3A includes a scale marker and was taken in a scanning electron microscope (SEM) at an accelerating voltage of 10 keV for a magnification of approximately 50×. The scale bar in FIG. 3A is 1.0 mm. As is shown, the grain size of the Li-stuffed garnet setter plate in FIG. 3A is approximately 3 microns to approximately 5 microns. In other embodiments, the grain size of the Li-stuffed garnet setter plate is between 2 microns and 10 microns. The thickness of the Li-stuffed garnet setter plate is approximately 1.2 mm. In one embodiment, Li-stuffed garnet setter plates having a thickness of approximately 1 mm to approximately 2 mm, a grain size of from 5 microns to 10 microns, and cast. The plates may be cast into or later singulated into a square or rectangular format of the desired dimensions, for example approximately 10 cm per side. Li-stuffed garnet setter plates that are thinner than approximately 0.1 or 0.5 mm and/or have grains of a $d_{50}$ larger than approximately 500 microns are prone to mechanical failure during use. The weight of the Li-stuffed garnet setter plate itself, when combined with grains having a characteristic dimension (e.g., a diameter or length of a crystal edge) that is about the thickness of the setter plate, may cause formation and/or propagation of inter-grain cracks. These cracks may cause the Li-stuffed garnet setter plates to fracture, rending them inadequate for continued use as setter plates.

Furthermore, the preferred grain size and surface features can be produced by cycling a Li-stuffed garnet setter plate from two to five times under temperatures used to produce Li-stuffed garnet solid electrolyte (i.e., seasoning the setter plate). Furthermore, the preferred grain size and surface features is produced when a Li-stuffed garnet setter plate is placed in contact with Li-stuffed garnet solid electrolyte and cycled according to the temperatures and pressures described in U.S. Patent Application Publication No. U.S. 2015/0099190, which published Apr. 9, 2015. This "sacrificial sintering" or "seasoning sintering" has the added benefit of preserving the lithium content and garnet phase in both the setter plate and solid electrolyte. In between the seasoning thermal cycles, the setter plates may be polished or not polished.

The lithium stuffed garnets described herein include crystalline garnet in combination with amorphous garnet. The crystalline component of the setter is the grains, which may be single crystals or which may be polycrystalline agglomerates. In some examples, the grains of the garnet setter are single crystals of garnet. In other examples, the grains of the garnet setter are polycrystalline. In the methods disclosed herein, seasoning the setters through thermal cycling has the unexpected benefit of conditioning the setters such that the setters are prevented from sticking to the sintering film that is placed between setter plates during a sintering procedure.

Figure 3B:
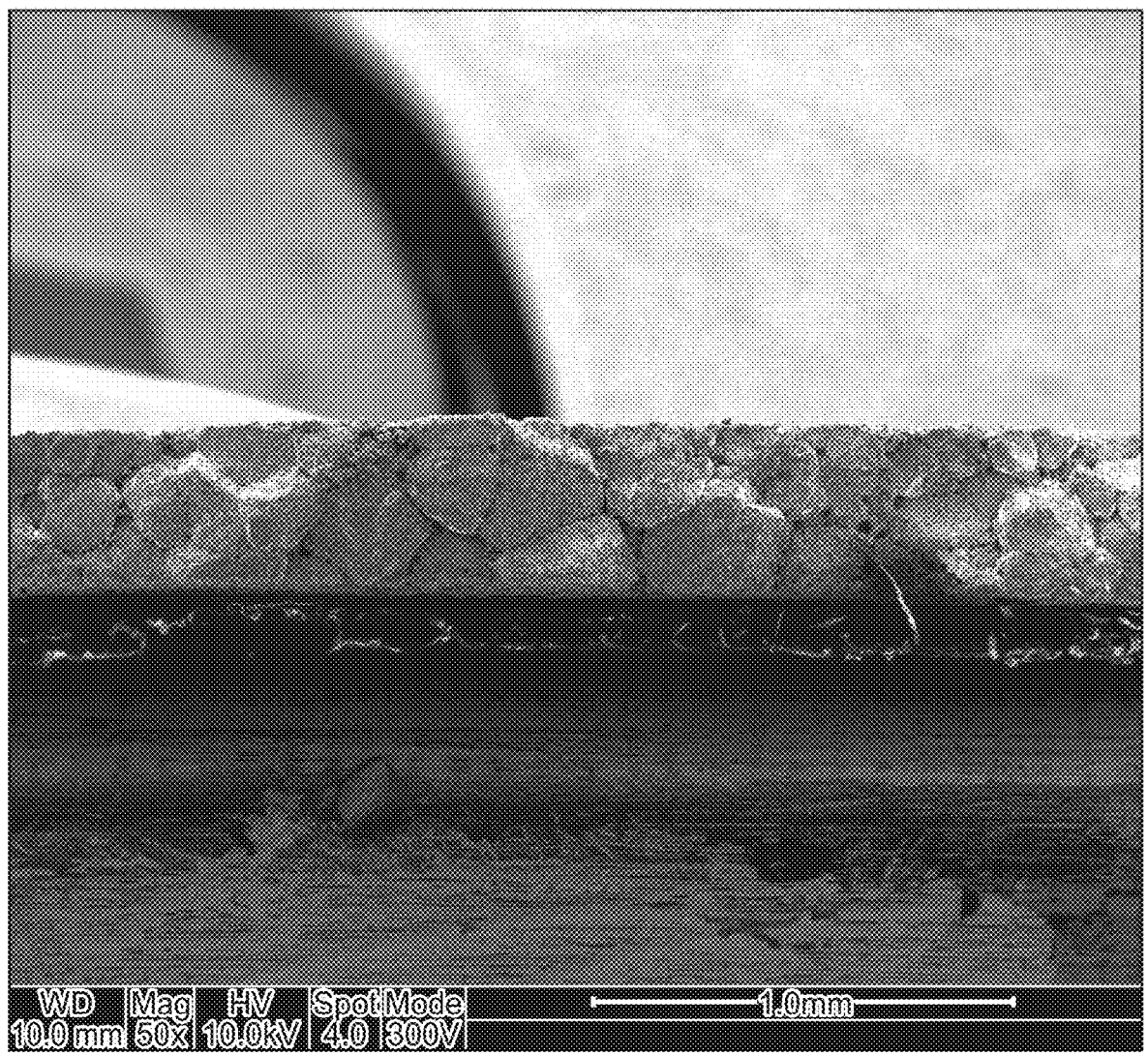
FIG. 3B is a cross-sectional SEM of a Li-stuffed garnet setter plate of the present disclosure that was thermally cycled (i.e., seasoned) to increase its grain size and reduce its tendency to adhere to sintering green films, in an embodiment.

FIG. 3B shows a Li-stuffed garnet setter plate that has been used in the preparation of Li-stuffed garnet solid electrolyte, and therefore thermally cycled repeatedly (in this case from between about 10 times and about 20 times) during the electrolyte sintering stage. As is shown, the setter plate itself is approximately 400 microns (0.4 mm) thick, and the grains therein range from approximately 100 microns to approximately 300 microns. This grain size has been found to grown in association with the thermal cycling, which results in setters that stick less to a given sintering film. One benefit of seasoning the setter plates is to reduce the ability of the setter plate to absorb Li from a sintering Li electrolyte.

Other benefits include a more crystalline garnet setter plate. Other benefits include a garnet setter plate lacking surface impurities. Other benefits include a garnet setter plate that has a lower chemical potential to absorb Li from the sintering garnet film. Additionally, thermally cycling the setter before first use with films reduces the tendency for sticking between setter and film. In some examples setters should be thermally cycled from 1-5 times in addition to the primary sintering step.

In some examples, the setter plates are polished prior to each instance of thermal cycling to expose a fresh surface. Without thermal treatment the first few uses of a setter can result in increased prevalence of sticking between setter and thin film.

Figure 4:
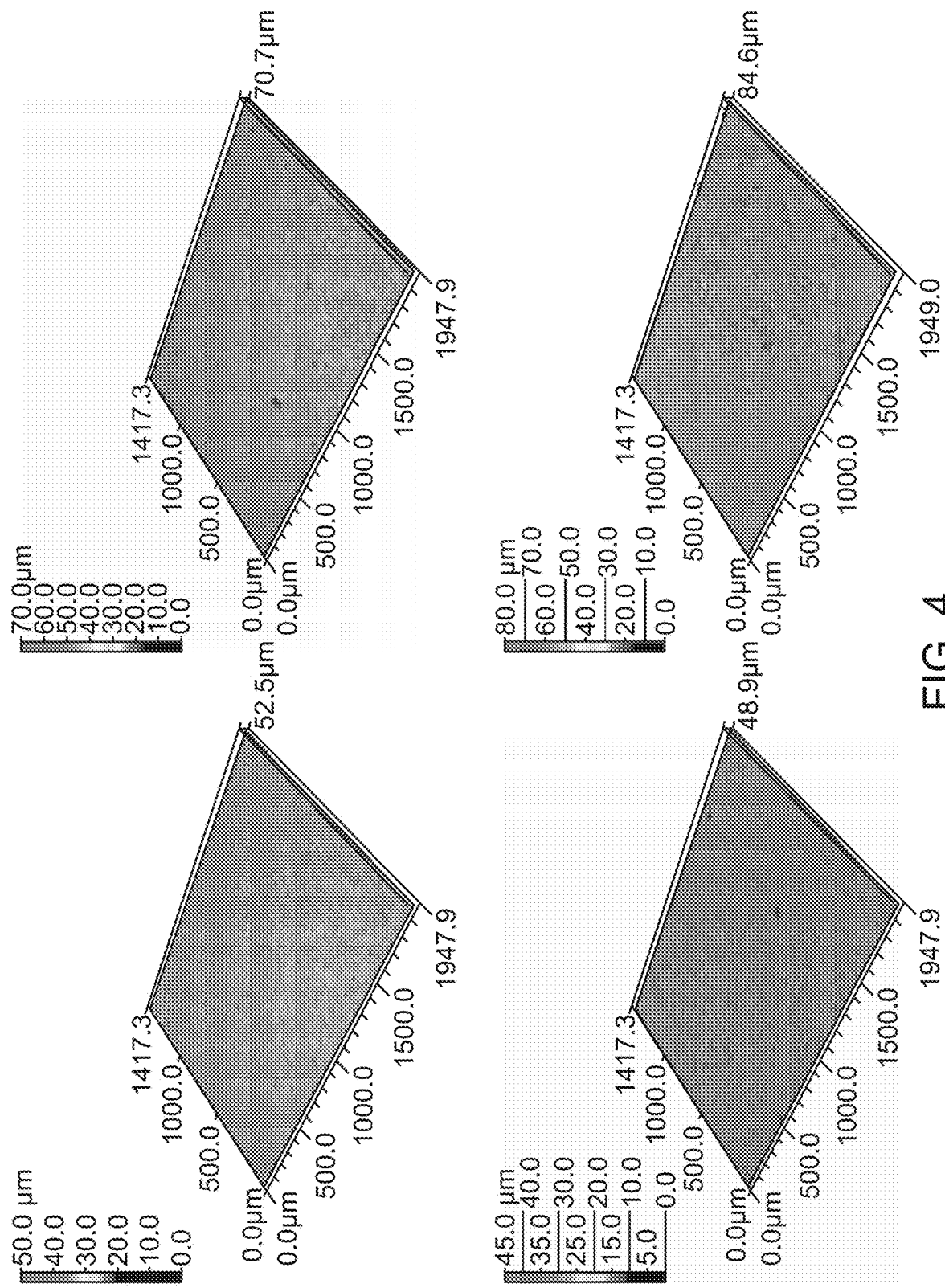
FIG. 4 illustrates four surface roughness measurements from a Li-stuffed garnet setter plate fabricated according to the method shown in FIG. 2, in an embodiment.

FIG. 4 illustrates surface roughness measurements of four example Li-stuffed setter plate produced by the method 200. The top two images are for polished setter plates, and the bottom two images are for unpolished setter plates. As can be seen, even prior to polishing, each of the rectangular sample areas of a setter plate (from approximately 1.4 mm to 2 mm per side) has a surface topography that is quite uniform. As can be seen, occasional protrusions of up to 50 microns extend from portions of the surface. This produces a surface roughness for Li-stuffed garnet setter plates having small grains (2 microns to 10 microns) from approximately 1.8 Ra to approximately 2.4 Ra when polished compared to from approximately 2.0 Ra to 2.7 Ra when left unpolished. For Li-stuffed garnet setter plates having large grains (100 microns to 400 microns), the surface roughness is from 3.5 Ra to 5.6 Ra when either polished or unpolished. Ra is a unit for quantifying surface roughness and is calculated from an arithmetic average of all absolute values of roughness amplitudes measured on a given sample.

In some other examples, another way to describe the Li-stuffed garnet setter plates described herein includes the $R_t$ parameter which is equal to $R_{peak}-R_{valley}$ and represents the maximum peak height in a given surface roughness measurement. In some examples, the Rt can range from about 1 μm to 30 μm. In some examples, the $R_t$ can range from about 1 μm to 28 μm. In some examples, the $R_t$ can range from about 10 μm to 30 μm. In some examples, the $R_t$ can range from about 15 μm to 30 μm.

The uniform topography with only small protrusions (generally removed or reduced in height during polishing) is one of the unexpected benefits of Li-stuffed setter plate. This uniform topography facilitates a uniform and planar surface on Li-stuffed solid electrolytes produced using the Li-stuffed setter plates, which in turn encourages intimate electrical contact between the solid electrolyte and corresponding positive and negative electrodes of a battery cell.

Figure 5A:
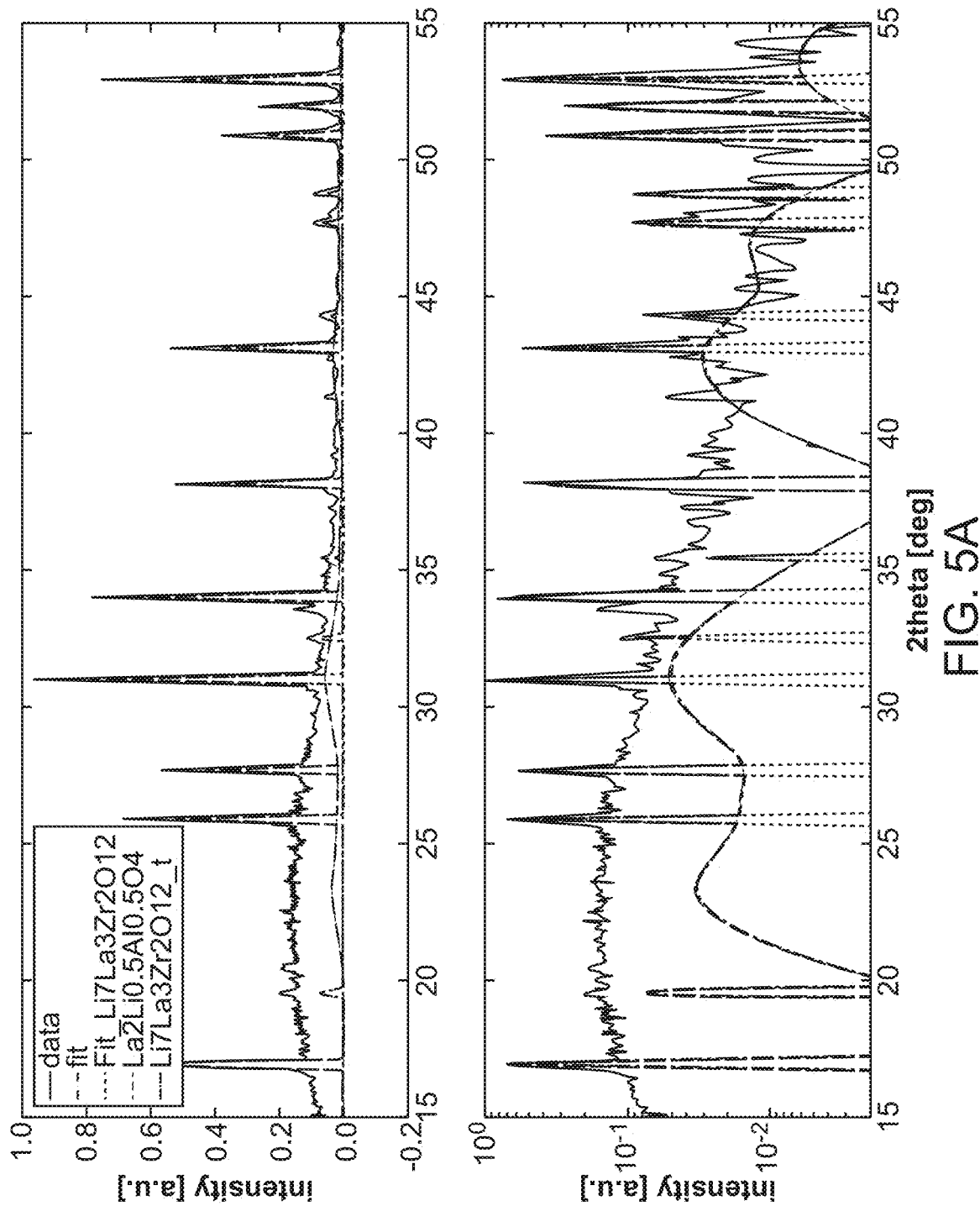
FIGS. 5A-5D illustrate X-ray diffraction (XRD) spectra for sintered Li-stuffed garnet electrolytes which were sintered with either polished small grain setter plates, unpolished small grain setter plates, polished large grain setter plates, or unpolished large grain setter plates, in certain embodiments. As noted in the method illustrated in FIG. 2, setter plates are initially polished following their preparation. Unpolished herein refers to a setter that has been thermally cycled (e.g., heated, i.e., seasoned) but not subsequently polished after the thermal cycle. Polished herein refers to a setter that has been thermally cycled and subsequently polished.
Figure 5B:
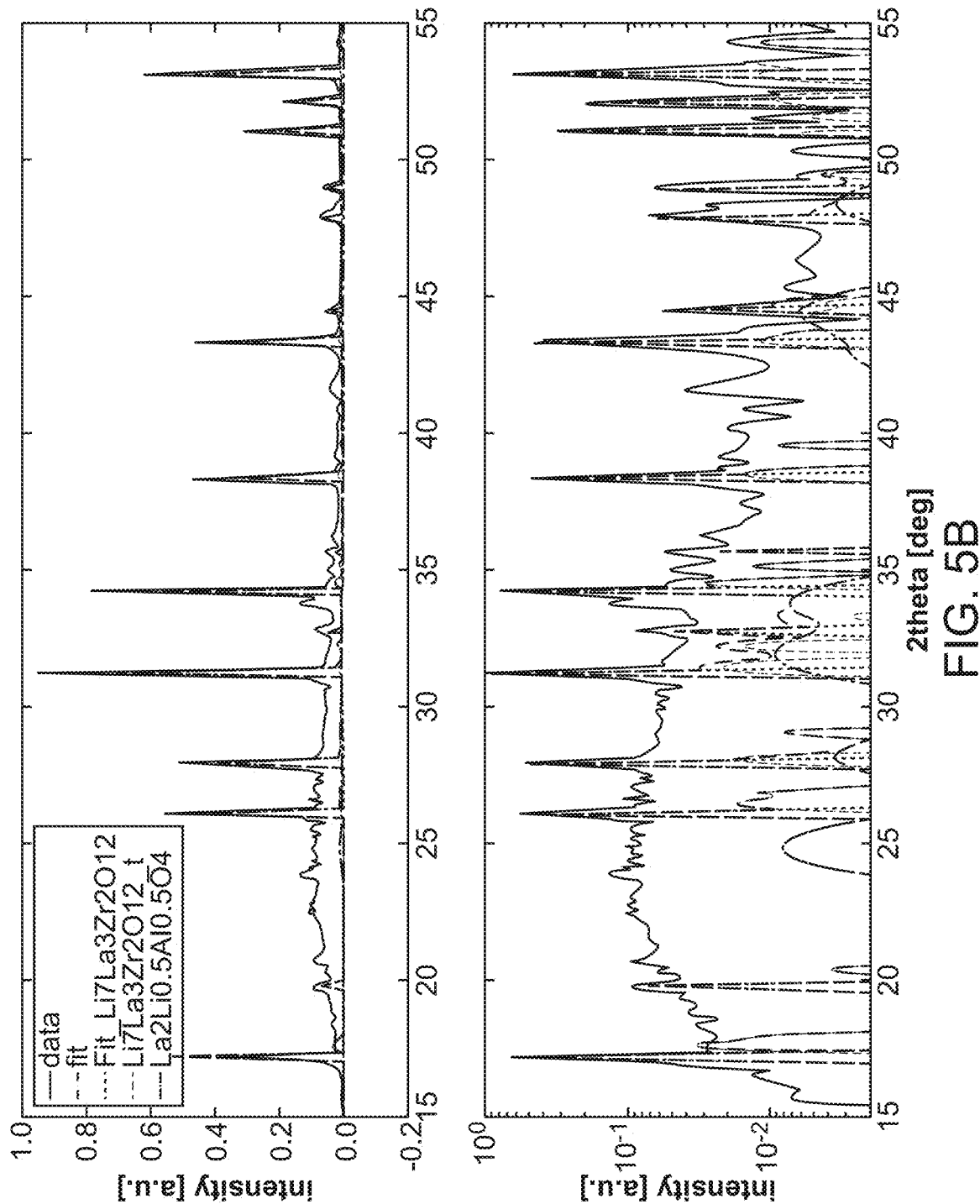
Figure 5C:
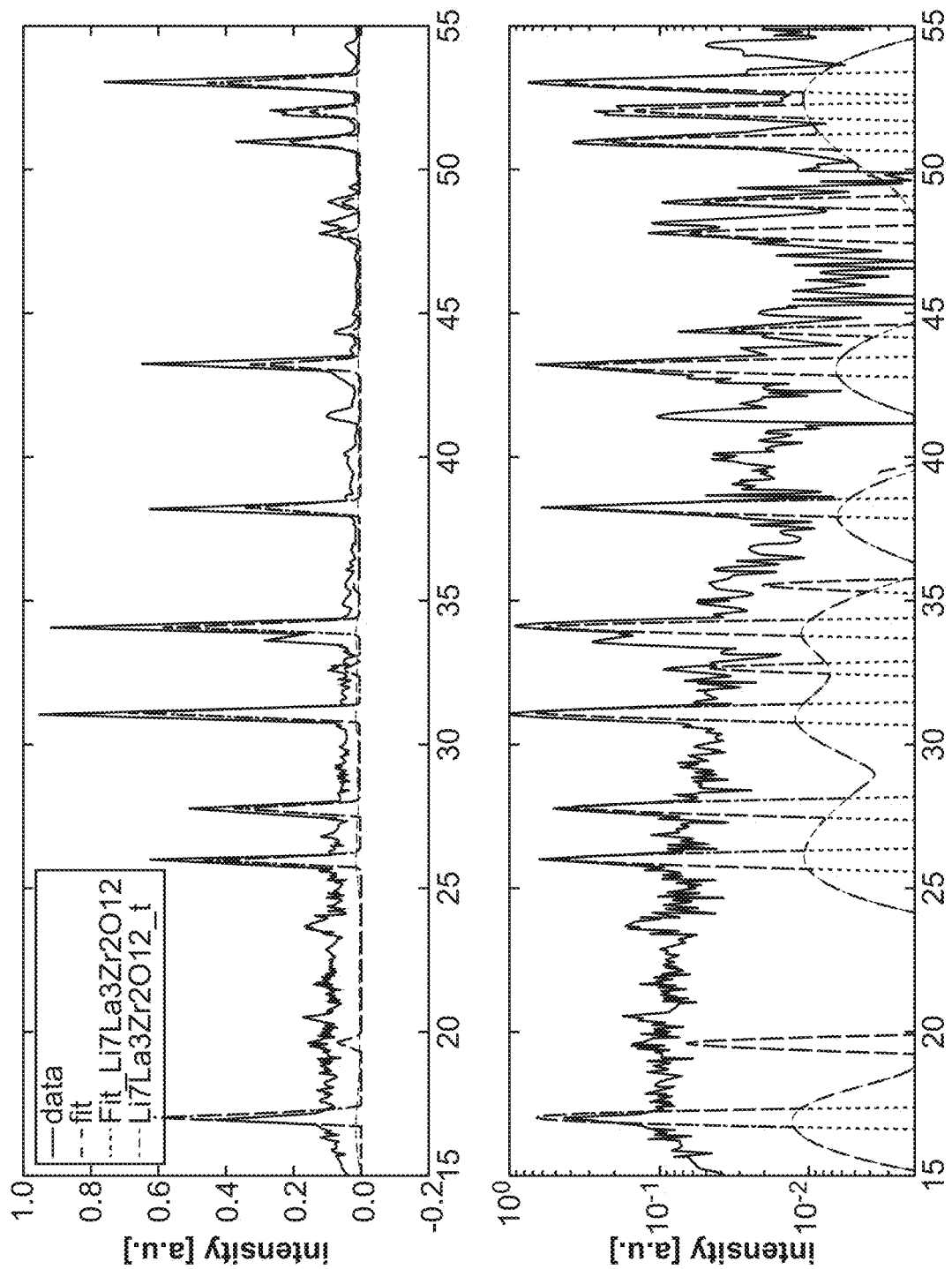
Figure 5D:
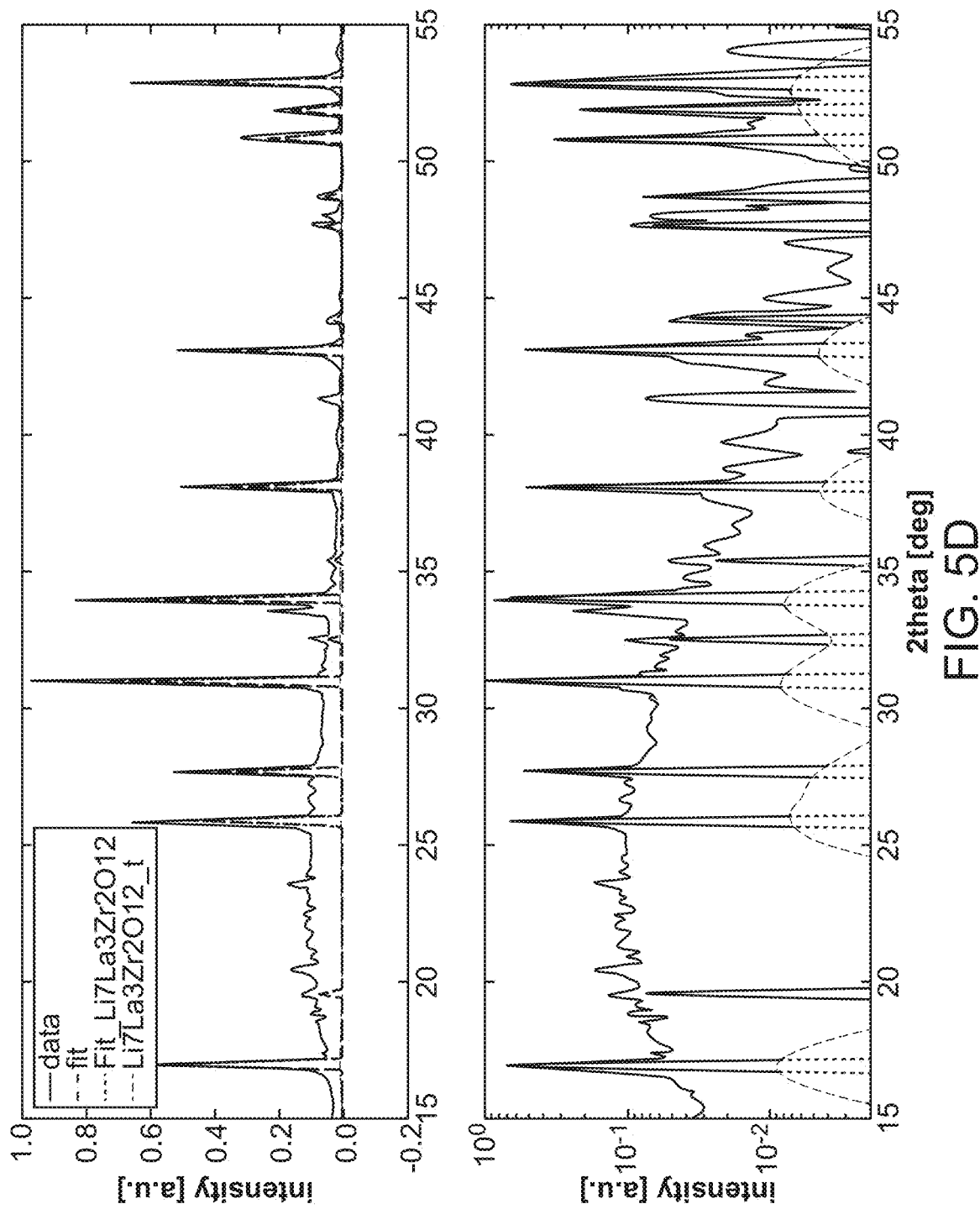

The effect of re-polishing (i.e., polishing between thermal cycling) Li-stuffed garnet setter plates prior to their use in sintering an unsintered film, and grain size of Li-stuffed garnet setter plates on the phase produced in Li-stuffed garnet solid electrolyte has also been studied. FIGS. 5A-5D illustrate X-ray diffraction patterns (produced by Cu K-alpha and measured via a 2-theta detector configuration) of Li-stuffed garnet solid electrolyte produced by various combinations of polished and unpolished Li-stuffed garnet setter plates of varying grain sizes. In the graph of FIG. 5A, an X-ray diffraction pattern is shown of a Li-stuffed solid electrolyte produced using a re-polished Li-stuffed garnet setter plate having small grains of a $d_{50}$ of approximately 2-10 um. In the graph of FIG. 5B, an X-ray diffraction pattern is shown of a Li-stuffed solid electrolyte produced using an unpolished Li-stuffed garnet setter plate having small grains of a $d_{50}$ of approximately 2-10 um. In the graph of FIG. 5C, an X-ray diffraction pattern is shown of a Li-stuffed solid electrolyte produced using a re-polished Li-stuffed garnet setter plate having large grains of a $d_{50}$ of approximately 100-400 um. In the graph of FIG. 5D, an X-ray diffraction pattern is shown of a Li-stuffed solid electrolyte produced using an unpolished (i.e., not refinished after thermally cycling the setter after it was initially produced and then polished prior to the thermal cycling) using a Li-stuffed garnet setter plate having large grains of a $d_{50}$ of approximately 100-400 um. As is evident upon inspection, all of the X-ray diffraction patterns show the presence and retention of the Li-stuffed garnet phase in the sintered film.

Highly conductive garnet electrolyte were prepared using Li-stuffed garnet setter plates that are polished and have grain sizes from approximately 100 microns to approximately 400 microns. Other highly conductive garnet electrolytes were prepared using unpolished Li-stuffed garnet setter plates having grain sizes from approximately 100 microns to approximately 400 microns. Some other highly conductive garnet electrolyte were prepared using Li-stuffed garnet setter plates are those that are unpolished and have a grain size from approximately 2 microns to 10 microns. Equally conductive garnet electrolyte were prepared using Li-stuffed garnet setter plates are those that are polished and have a grain size from approximately 2 microns to 10 microns.

Method of Using Setters

Figure 6:
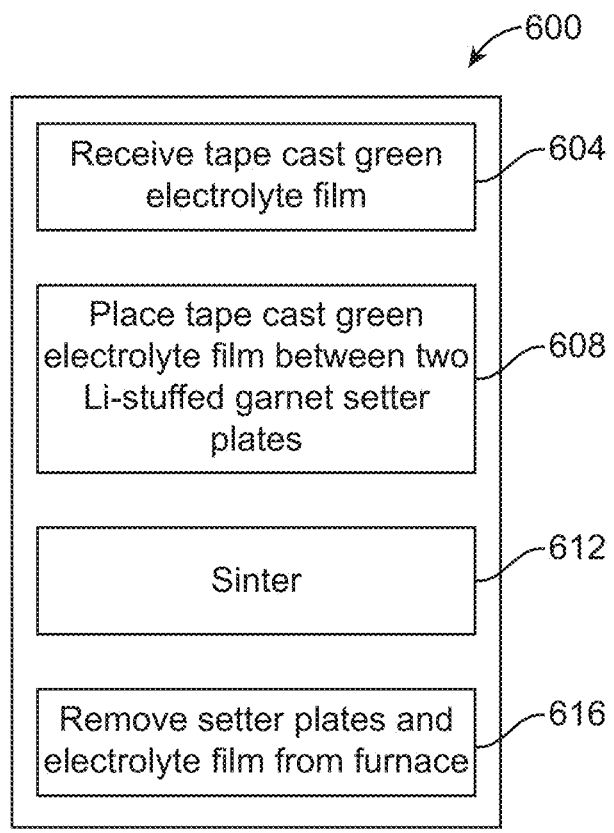
FIG. 6 illustrates a method of using Li-stuffed garnet setter to sinter a Li-stuffed garnet solid electrolyte, in an embodiment.

FIG. 6 illustrates a method 600 of using Li-stuffed garnet setter plates to fabricate Li-stuffed garnet solid electrolyte, in an embodiment. A tape-cast "green film" (i.e., a film of unsintered Li-stuffed garnet precursor materials, binders, and other materials used in the preparation of Li-stuffed garnet solid electrolyte as described in U.S. Patent Application Publication No. U.S. 2015/0099190, which published Apr. 9, 2015, which is incorporated by reference herein), and is received 604 in preparation for sintering. The tape-cast green film is placed between two Li-stuffed garnet setter plates of the present disclosure in step 608. In some examples, a tape-cast green film is placed on top of a Li-stuffed garnet setter plate. In one embodiment, each of Li-stuffed garnet setter plates is approximately square in shape from a plane view with approximately 10 cm on each of four sides, and is approximately 1 mm to approximately 2 mm thick. Thus placed, the solid electrolyte "green film" is sintered 612 in a 99.94:0.06::Argon:$H_2$ atmosphere at about 1100° C., although temperatures from approximately 850° C. to approximately 1300° C. have also been found to be effective at producing Li-stuffed garnet phase in the sintered electrolyte. In some examples, the green film is sintered in an Argon:$H_2$ atmosphere at 850° C. In some examples, the green film is sintered in an Argon:$H_2$ atmosphere at 900° C. In some examples, the green film is sintered in an Argon:$H_2$ atmosphere at 950° C. In some examples, the green film is sintered in an Argon:$H_2$ atmosphere at 1000° C. In some examples, the green film is sintered in an Argon:$H_2$ atmosphere at 1050° C. In some examples, the green film is sintered in an Argon:$H_2$ atmosphere at 1100° C. Sintering is performed from 0.5 hours to 6 hours. In some examples, sintering is performed until the green film achieves its maximum possible density. In other examples, the solid electrolyte "green film" is sintered 612 in a 95:5::Argon:$H_2$ atmosphere at about 1100° C., although temperatures from approximately 850° C. to approximately 1300° C. have also been found to be effective at producing Li-stuffed garnet phase in the sintered electrolyte. Sintering is then performed from 0.5 hours to 6 hours (e.g., 4 hours).

For example, sintering can be performed for about 0.5 hours, 1 hour, 2 hours, 3 hours, 4 hours, 5 hours, 6 hours, or for any duration of time between any two of these values.

In some examples, the green film is sintered in a Nitrogen:$H_2$ atmosphere at 850° C. In some examples, the green film is sintered in a Nitrogen:$H_2$ atmosphere at 900° C. In some examples, the green film is sintered in a Nitrogen:$H_2$ atmosphere at 950° C. In some examples, the green film is sintered in a Nitrogen:$H_2$ atmosphere at 1000° C. In some examples, the green film is sintered in a Nitrogen:$H_2$ atmosphere at 1050° C. In some examples, the green film is sintered in a Nitrogen:$H_2$ atmosphere at 1100° C.

In some examples, the green film is sintered in a Nitrogen atmosphere at 850° C. In some examples, the green film is sintered in a Nitrogen atmosphere at 900° C. In some examples, the green film is sintered in a Nitrogen atmosphere at 950° C. In some examples, the green film is sintered in a Nitrogen atmosphere at 1000° C. In some examples, the green film is sintered in a Nitrogen atmosphere at 1050° C. In some examples, the green film is sintered in a Nitrogen atmosphere at 1100° C.

In some examples, an oven is heated from room temperature to the sintering temperature with the setter plates and the unsintered film therebetween inside the heating oven. In some other examples, the samples are placed into an oven that is already hot. In some examples, the samples are cooled naturally by removing them from the oven. For example, the samples can be removed from the oven and placed at room temperature (about 22° C. to 25° C.) In other examples, the samples are controllably cooled by slowly reducing the temperature of the oven. Cooling protocols are used so as to avoid thermal shock of the ceramic.

The setter plates and solid electrolyte are removed 616 from the furnace. One unexpected benefit of Li-stuffed garnet setter plates of the present disclosure (in addition to preserving the Li-stuffed garnet phase of the solid electrolyte mentioned above) is the low adhesion of Li-stuffed garnet setter plates to the solid electrolyte and the relatively beneficial density of the Li-stuffed garnet setter plates compared to commercially available setter plates conventionally used such as porous Yttria stabilized Zirconia, alumina, graphite. Because of the appropriate density and low adhesion, the Li-stuffed garnet setter plates are removed from the Li-stuffed garnet solid electrolyte without damaging the solid electrolyte, which can be relatively fragile when only from approximately 10 microns to approximately 100 microns thick. This range of thickness values of the solid electrolyte is useful for producing a solid state battery having adequate ionic conductivity and energy delivery rates, as mentioned above. Commercially available setter plates (such as alumina, zirconia, and platinum) are generally not suitable for use (e.g., reactive) in the production of Li-stuffed garnet solid electrolyte because they stick to or adhere to the sintered film and will often cause cracking or mechanical failure, and poor electrical properties, of the solid electrolyte having a thickness from 10 microns to 100 microns.

Electrical Performance

While the benefits to the mechanical performance of setter plates have been presented above for Li-stuffed garnet setter plates of the present disclosure, benefits are also present with respect to electrical performance, specifically the ionic conductivity, of Li-stuffed garnet solid electrolyte produced using Li-stuffed garnet setter plates of the present disclosure.

Lithium-stuffed garnet films were fabricated according to the method in FIG. 6. The films were characterized by an empirical formula $Li_7La_3Zr_2O_{12}Al_2O_3$. The films were sintered between lithium-stuffed garnet setter plates at 1150° C. for 6 hours. After sintering, the films were approximately 50 µm thick and circularly shaped with a top surface area of approximately 0.5 cm². Area specific resistance or "ASR," as described in U.S. Patent Application Publication No. U.S. 2015/0099190, which published Apr. 9, 2015, was measured by electrical impedance spectroscopy for these films at 20° C., 50° C., 60° C., or 80° C. Both AC and DC impedance test were conducted on these films with lithium electrodes deposited on each side. The results are tabulated below in Table 1, wherein R1 represents the bulk resistance, R2 represents the interfacial resistance, and ASR equals (R2/2) *Area, where the factor of 2 is to account for the 2 interfaces in the test. In this Example, the area was approximately 0.5 cm².

TABLE 1

|  | R1 (Ω) | R1 (Ω) | ASR (Ωcm²) |
| --- | --- | --- | --- |
| 80° C. | 9.9 ± 0.1 | 0.0 | 0 |
| 60° C. | 16 ± 0.1 | 0.0 | 0 |
| 50° C. | 20.9 ± 0.2 | 0.0 | 0 |
| 20° C. | 46.2 ± 0.4 | 6.5 | 1.6 |

Figure 7:
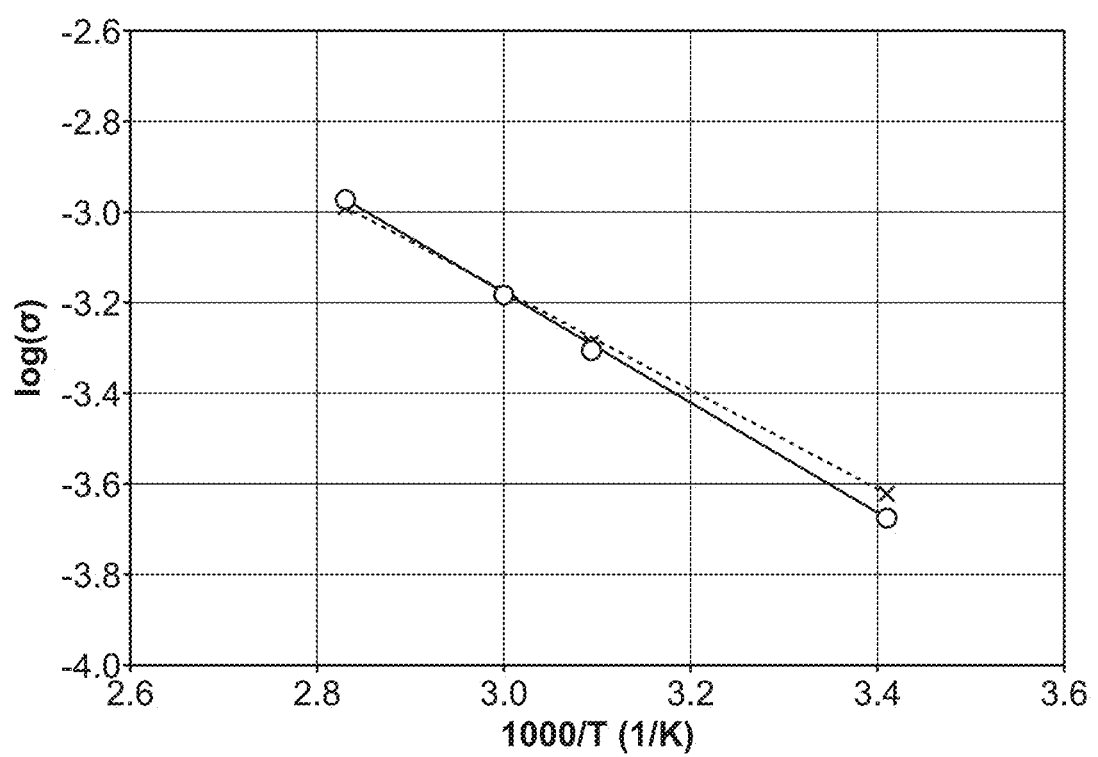
FIG. 7 illustrates an Arrhenius plot ($\log(\sigma)$ v. 1000/T in Kelvin) of electrical impedance spectroscopy (EIS) results for solid state Li-stuffed electrolytes films fabricated according to the method illustrated in FIG. 6 and sintered between two Li-stuffed garnet containing setter plates and in which lithium metal was deposited onto the sintered electrolyte and then tested for ionic conductivity at 20° C., 50° C., 60° C., and 80° C. in a symmetric Li|Garnet|Li cell.

FIG. 7 shows an Arrhenius plot of EIS (AC Impedance) test results at 80° C., 60° C., 50° C. and 20° C. on three Li-stuffed garnet solid electrolyte samples in a symmetric Li|Garnet|Li cell. A conductivity value 1.03E-3 S/cm at 60° C. was observed. These results show surprisingly high ionic conductivity for Li-stuffed garnet solid electrolytes prepared using the garnet setter plates of the instant disclosure. As indicated by FIG. 7, low interfacial impedance values are achievable when metallic lithium is deposited on the Li-stuffed garnet electrolyte after fabrication is completed according to the method 600. FIG. 7 is an Arrhenius plot of conductivity as function of 1000/T for the films tested.

Figure 8:
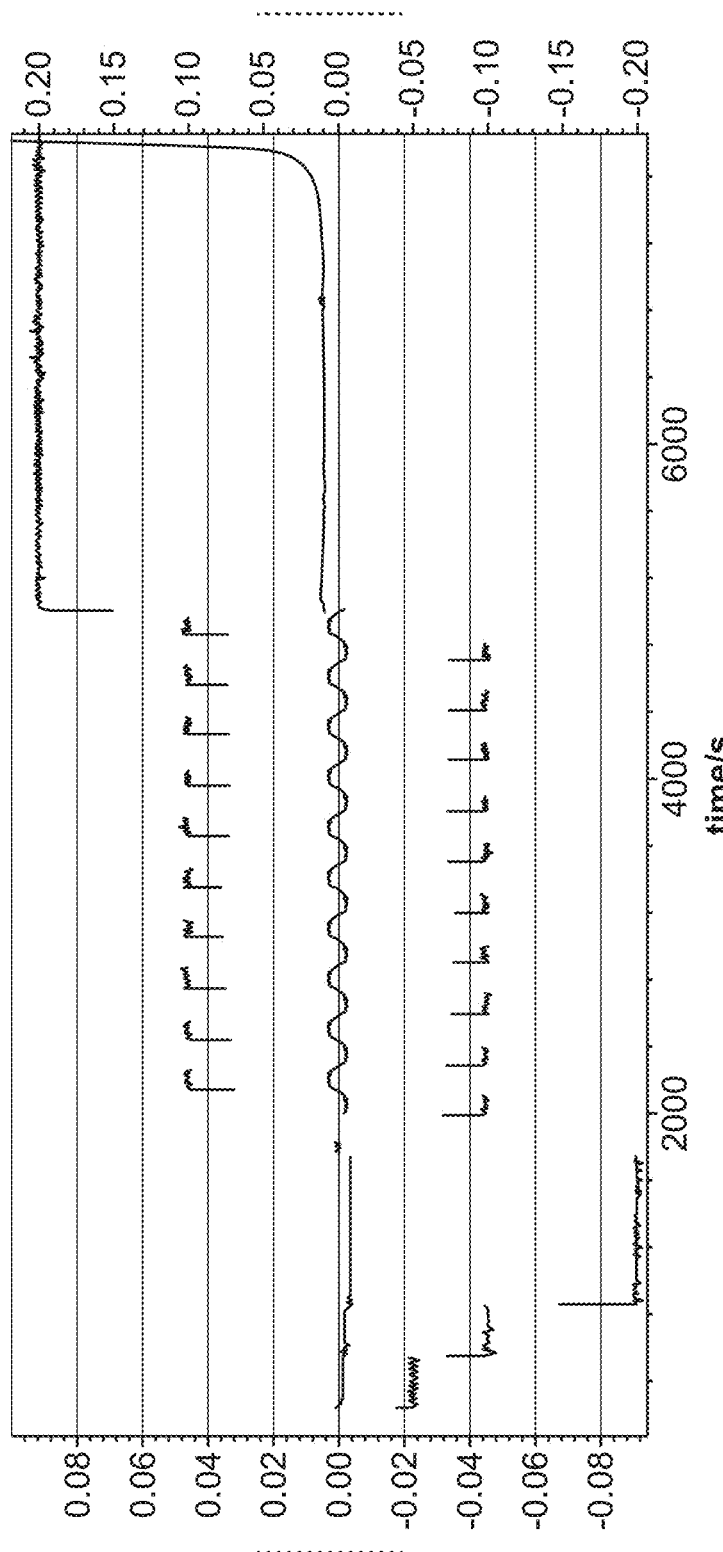
FIG. 8 shows DC Testing results for a Li-stuffed garnet electrolyte fabricated according to the method illustrated in FIG. 6 and sintered between two Li-stuffed garnet containing setter plates of the present disclosure and in which the electrolytes were tested in a symmetric Li|Garnet|Li cell.

FIG. 8 shows a lithium plating and stripping experiment. In this Example, Lithium-stuffed garnet films were fabricated according to the method in FIG. 6. The films were characterized by an empirical formula $Li_7La_3Zr_2O_{12}Al_2O_3$. The films were sintered between lithium-stuffed garnet setter plates at 1150° C. for 6 hours. After sintering, the films were approximately 50 um thick and circularly shaped with a top surface area of approximately 0.5 cm². These films were tested by conducting an initial plating step of Li at 0.1 mA/cm² (for 5 minutes), followed by a plating step of Li at 0.2 mA/cm² (for 5 minutes) and then followed by a plating step of Li at 0.4 mA/cm² (for 15 minutes), followed by open-circuit voltage (OCV) steps for 2 minutes. This was followed by cycling step of 10 cycles of 0.2 mA/cm² for 120 s in each polarity, interspersed with an OCV step of 30s. A Final step including a full strip of Li at 0.4 mA/cm² was then performed. The data in FIG. 8 was observed in a DC Test of a symmetric Li|Garnet|Li cell.

Figure 9:
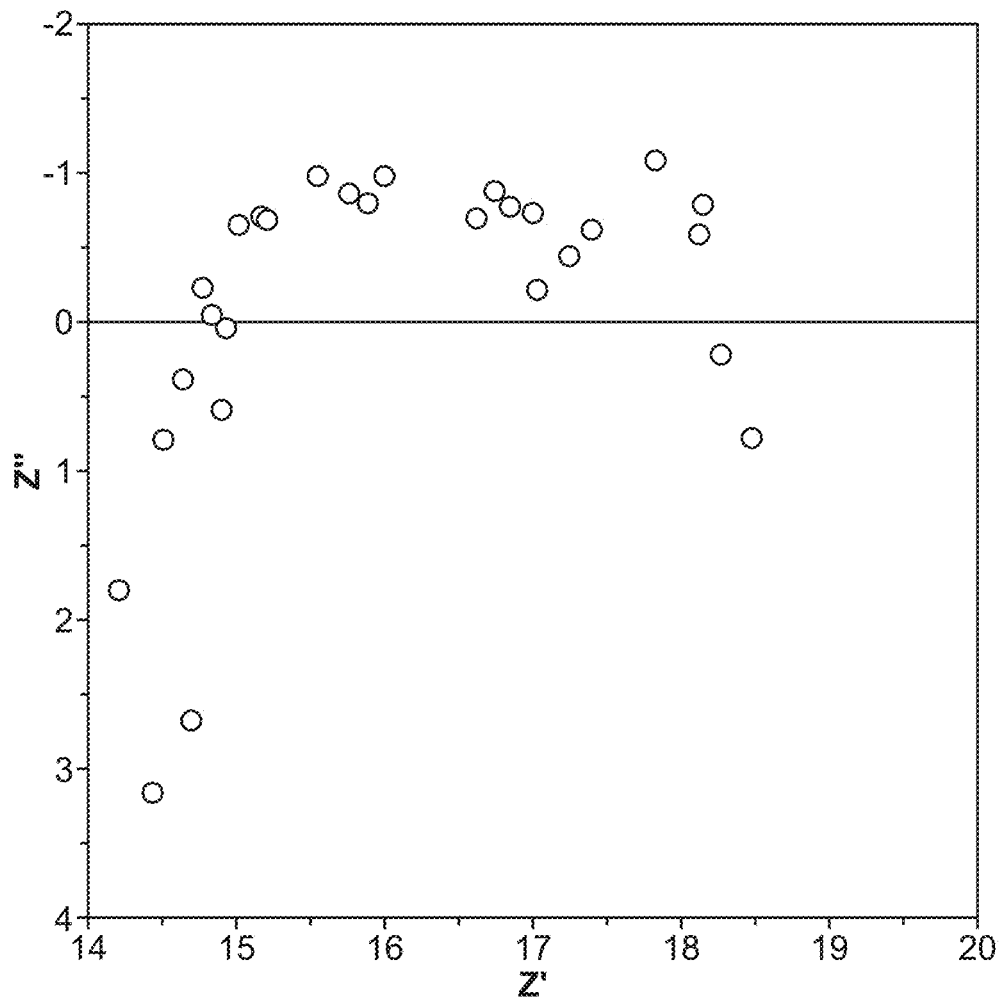
FIG. 9 shows an example of an EIS (AC Impedance) testing at 60° C. for a Li-stuffed garnet electrolyte prepared using Li-stuffed setter plates of the present disclosure and in which the electrolytes were tested in a symmetric Li|Garnet|Li cell.

In another Example, lithium-stuffed garnet films were fabricated according to the method in FIG. 6. The films were characterized by an empirical formula $Li_7La_3Zr_2O_{12}.Al_2O_3$. The films were sintered between lithium-stuffed garnet setter plates at 1150° C. for 6 hours. After sintering, the films were approximately 50 um thick and circularly shaped with a top surface area of approximately 0.5 cm². These films were tested as shown in FIG. 9, which shows an example EIS plot of the at 60° C. This plot demonstrates an ASR (area specific resistance)=(DC Impedance−AC Bulk Impedance)/2*Area= (22Ω−14.8Ω)/2*0.5 cm²=1.8 Ω·cm². These results show surprisingly low impedance for Li-stuffed garnet solid electrolytes prepared using the garnet setter plates of the instant disclosure.

Setter Performance

Figure 10:
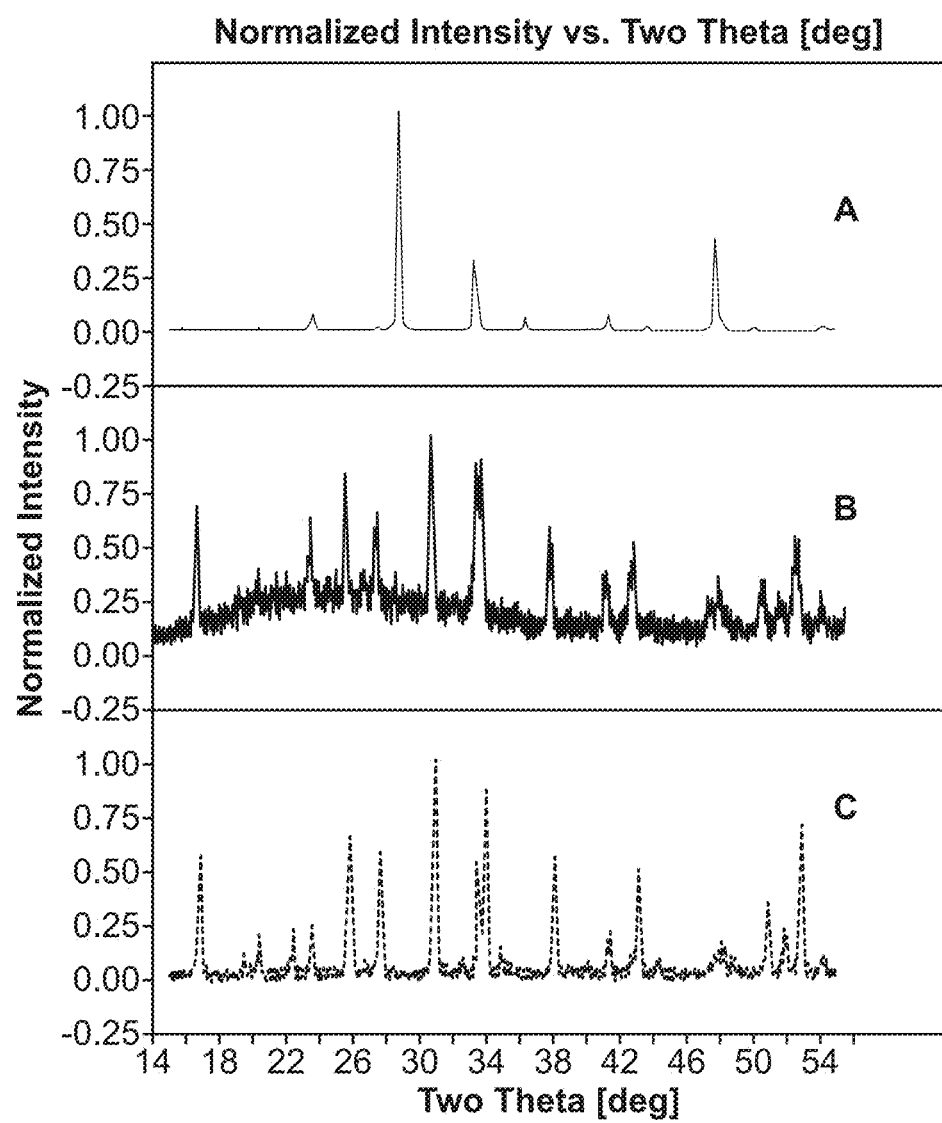
FIG. 10 shows XRD spectra for three Lithium-stuffed garnet films fabricated according to the method illustrated in FIG. 6 and sintered between either two $ZrO_2$ setter plates (top, A), two $Al_2O_3$ setter plates (middle, B), or two lithium-stuffed garnet setter plates (bottom, C).

A series of green films were prepared as follows including garnet precursors to $Li_7Li_3Zr_2O_{12}Al_2O_3$ and were sintered between either $ZrO_2$ setter plates, $Al_2O_3$ setter plates or lithium stuffed garnet setter plates characterized by the composition $Li_7Li_3Zr_2O_{12}Al_2O_3$. As shown in FIG. 10 (top, part A), the film sintered between $ZrO_2$ setter plates did not retain the garnet crystal structure and evidenced a complete loss of this garnet phase. As shown in FIG. 10 (middle, part B), the film sintered between $Al_2O_3$ setter plates also did not retain the garnet crystal structure though some XRD reflections associated with garnet are observed. FIG. 10, part B, also shows that some amorphous material was present post-sintering. However, as shown in FIG. 10 (bottom, part C), the film sintered between lithium stuffed garnet setter plates characterized by the composition $Li_7Li_3Zr_2O_{12}Al_2O_3$ did retain the garnet crystal structure. The results in parts A and B of FIG. 10 may be due to the loss of Li from the sintering green film on account of the difference in chemical potential for the Li in the sintering green film as compared to in either the $ZrO_2$ setter or in the $Al_2O_3$ setter.

Setter Conditions

As described in Ikeda, Y., et al., Journal of Nuclear Materials 97 (1981) 47-58 and also Kato, Y, et al. Journal of Nuclear Materials 203 (1993) 27-35, various lithium containing oxides have a measureable Li vapor pressure. When heated, lithium compounds such as $Li_2ZrO_3$ and can volatilize and introduce gaseous species, such as but not limited to Li(g), LiO(g), $Li_2O$(g) and $O_2$(g). Other material, such as $Li_5AlO_4$ or $LiAlO_2$, $LiAl_5O_8$ can also volatize these species. The present disclosure finds that by using Li-stuffed garnet setter plates, the partial pressure of these species, such as Li, LiO(g), or $Li_2O$(g) can be maintained between 1 to $10^{-5}$ Pascal (Pa) range. In some examples, the partial pressure of the volatile Li species is 1 Pa. In some examples, the partial pressure of the volatile Li species is $10^{-1}$ Pa. In some examples, the partial pressure of the volatile Li species is $10^{-2}$ Pa. In some examples, the partial pressure of the volatile Li species is $10^{-3}$ Pa. In some examples, the partial pressure of the volatile Li species is $10^4$ Pa. In some examples, the partial pressure of the volatile Li species is $10^{-5}$ Pa. This range has been found to be useful for maintaining the Li content in a sintering green film. In some examples, the setter plates used herein maintain, within a sintering over or furnace, a partial pressure of volatile Li species between.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method of using a Li-stuffed garnet setter plate to fabricate a Li-stuffed garnet solid electrolyte film for a rechargeable battery, the method comprising: placing a green film of unsintered Li-stuffed garnet precursor materials on top of a Li-stuffed garnet setter plate,
wherein the Li-stuffed garnet setter plate comprises:
a lithium-stuffed garnet characterized by the formula $Li_aLa_bZr_cAl_dM_e"O_f$, wherein $5<a<8.5$; $2<b<4$; $0<c\leq2.5$; $0\leq d<2$; $0\leq e<2$, and $10<f<13$ and M" is a metal selected from Nb, Ta, V, W, Mo, or Sb; and
at least one member selected from the group consisting of $Li_2ZrO_3$, $Li_2SiO_3$, $LiLaO_2$, $LiAlO_2$, $Li_2O$, and $Li_3PO_4$; and
sintering the green film on top of the Li-stuffed garnet setter plate to form a sintered garnet film.

2. The method of claim 1, wherein the green film of unsintered Li-stuffed garnet precursor materials further comprises metal powder.

3. The method of claim 2, wherein the metal powder is Ni, Cu, Fe, Al, Ag, an alloy of Ni, an alloy of Cu, an alloy of Fe, an alloy of Al, an alloy of Ag, or a combination thereof.

4. The method of claim 1, wherein the green film has a surface defined by a first lateral dimension from 1 cm to 50 cm and a second lateral dimension from 1 cm to 50 cm.

5. The method of claim 4, wherein the green film has a surface defined by a first lateral dimension from 1 cm to 30 cm and a second lateral dimension from 1 cm to 30 cm.

6. The method of claim 1, wherein the green film has a thickness between 1 μm to 80 μm.

7. The method of claim 1, wherein the green film has a thickness between 1 μm to 50 μm.

8. The method of claim 1, wherein the green film is a tape-cast green film.

9. The method of claim 1, wherein the sintered Li-stuffed garnet solid electrolyte produced is less than 50 microns thick.

10. The method of claim 9, wherein the sintered Li-stuffed garnet solid electrolyte produced is less than 30 microns thick.

11. The method of claim 1, wherein the sintered Li-stuffed garnet solid electrolyte produced has an ASR less than 10 $\Omega \cdot cm^2$ at 50° C.

12. The method of claim 1, wherein Li-stuffed garnet setter plate comprises $Li_2ZrO_3$.

13. The method of claim 1, wherein Li-stuffed garnet setter plate comprises $Li_2SiO_3$.

14. The method of claim 1, wherein Li-stuffed garnet setter plate comprises $LiAlO_2$.

15. The method of claim 1, wherein Li-stuffed garnet setter plate comprises $Li_2O$.

16. The method of claim 1, wherein Li-stuffed garnet setter plate comprises $Li_3PO_4$.

17. The method of claim 1, further comprising placing a metal foil or metal powder between at least one setter plate and the green film prior to the sintering the green film.

18. The method of claim 17, wherein the metal powder is Ni, Cu, Fe, Al, Ag, an alloy of Ni, an alloy of Cu, an alloy of Fe, an alloy of Al, an alloy of Ag, or a combination thereof.

19. The method of claim 1, wherein the sintering comprises heating the green film and Li-stuffed garnet setter plate to between 450° C. and 1300° C.

20. The method of claim 1, wherein the sintering comprises heating the green film and Li-stuffed garnet setter plate to between 1000° C. and 1300° C.

* * * * *